US011933408B2

(12) United States Patent
Nelson et al.

(10) Patent No.: US 11,933,408 B2
(45) Date of Patent: *Mar. 19, 2024

(54) MULTI-FUNCTION PRESSURE REGULATION VALVE

(71) Applicant: Nelson Irrigation Corporation, Walla Walla, WA (US)

(72) Inventors: Craig B. Nelson, Walla Walla, WA (US); Riley D. Greenwood, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/474,437

(22) Filed: Sep. 14, 2021

(65) Prior Publication Data

US 2021/0404572 A1    Dec. 30, 2021

Related U.S. Application Data

(63) Continuation-in-part of application No. 16/386,899, filed on Apr. 17, 2019, now Pat. No. 11,126,208.

(Continued)

(51) Int. Cl.
*F16K 31/122* (2006.01)
*F16K 1/12* (2006.01)
(Continued)

(52) U.S. Cl.
CPC .............. *F16K 1/126* (2013.01); *F16K 1/123* (2013.01); *G05D 16/0608* (2013.01);
(Continued)

(58) Field of Classification Search
CPC .... F04B 53/1022; F04B 53/103; F16K 1/123; F16K 1/126; F16K 1/523; F16K 3/265;
(Continued)

(56) References Cited

U.S. PATENT DOCUMENTS

| 383,314 | A | ‡ | 5/1888 | McLaughlin | ........ | G05D 16/103 |
| | | | | | | 137/505.25 |
| 444,082 | A | * | 1/1891 | Abbe | ................... | G05D 16/103 |
| | | | | | | 137/505.25 |

(Continued)

FOREIGN PATENT DOCUMENTS

| JP | 2767544 B2 | * | 6/1998 |
| JP | 2767550 B2 | * | 6/1998 |

(Continued)

OTHER PUBLICATIONS

B.A. King et al., "A Variable Flow Rate Sprinkler For Site-Specific Irrigation Management", vol. 20(6):, 765-770, 2004 American Society of Agricultural Engineers ISSN 0883-8542.‡

(Continued)

*Primary Examiner* — Robert K Arundale
*Assistant Examiner* — Richard K. Durden
(74) *Attorney, Agent, or Firm* — NIXON & VANDERHYE P.C.

(57) ABSTRACT

A flow control device includes a housing with an inlet and an outlet and a flow conduit disposed in the housing. The inlet, the flow conduit, and the outlet define a flow passage. A valve seat is disposed in the housing downstream of the inlet, and a shuttle is movably disposed in the housing and displaceable between a closed position engaging the valve seat to close the flow passage and an open position spaced from the valve seat to open the flow passage. A sealed chamber is defined between the housing and the flow (Continued)

conduit. A port coupled with a source of pressurized fluid communicates with the sealed chamber, where the shuttle is displaceable between the closed position and the open position based on a pressure in the sealed chamber. The threshold water pressure for displacing the flow conduit may be adjustable by modifying the pressure in the sealed chamber.

20 Claims, 17 Drawing Sheets

Related U.S. Application Data

(60) Provisional application No. 62/658,968, filed on Apr. 17, 2018.

(51) Int. Cl.
| | |
|---|---|
| *G05D 16/06* | (2006.01) |
| *G05D 16/18* | (2006.01) |
| *G05D 16/20* | (2006.01) |
| *F16K 17/04* | (2006.01) |
| *F16K 17/08* | (2006.01) |
| *F16K 17/164* | (2006.01) |
| *F16K 31/363* | (2006.01) |
| *F16K 31/365* | (2006.01) |

(52) U.S. Cl.
CPC ..... *G05D 16/2095* (2019.01); *G05D 16/2097* (2019.01); *F16K 17/0413* (2013.01); *F16K 17/082* (2013.01); *F16K 17/085* (2013.01); *F16K 17/164* (2013.01); *F16K 31/1223* (2013.01); *F16K 31/1228* (2013.01); *F16K 31/363* (2013.01); *F16K 31/365* (2013.01); *G05D 16/185* (2013.01); *G05D 16/187* (2019.01)

(58) Field of Classification Search
CPC ............... F16K 15/025; F16K 15/1826; F16K 17/0413; F16K 17/048; F16K 17/06; F16K 17/065; F16K 17/10; F16K 31/1223; F16K 31/1226; F16K 31/1228; F16K 31/363; F16K 2200/502; G05D 16/0608; G05D 16/10; G05D 16/103; G05D 16/106; G05D 16/18; G05D 16/185; G05D 16/187; G05D 16/2066; G05D 16/2086; G05D 16/2093; G05D 16/2095; G05D 16/2097; Y10T 137/7762; Y10T 137/7768; Y10T 137/7797; Y10T 137/7808
See application file for complete search history.

(56) References Cited

U.S. PATENT DOCUMENTS

| | | | | | |
|---|---|---|---|---|---|
| 2,296,145 | A | * | 9/1942 | Christensen | G05D 16/10 60/590 |
| 2,311,009 | A | * | 2/1943 | Urquhart | F16K 1/46 285/379 |
| 2,600,137 | A | * | 6/1952 | Teague, Jr. | G05D 16/106 137/505.25 |
| 2,761,389 | A | ‡ | 9/1956 | Turner | G05D 16/0655 417/83 |
| 2,930,401 | A | * | 3/1960 | Cowan | F16K 15/025 417/DIG. 1 |
| 2,935,083 | A | * | 5/1960 | Singer | G05D 16/0641 251/333 |
| 3,435,843 | A | * | 4/1969 | Spencer | G05D 16/103 137/505.25 |
| 3,435,844 | A | * | 4/1969 | Stelzer | F16K 17/26 137/543.13 |
| 3,664,369 | A | * | 5/1972 | Johnson | G05D 16/0658 137/550 |
| 3,709,247 | A | * | 1/1973 | Roth | F16K 31/58 137/271 |
| 3,874,404 | A | ‡ | 4/1975 | Waight | F16K 17/20 137/493 |
| 3,890,999 | A | ‡ | 6/1975 | Moskow | G05D 16/103 137/505.25 |
| 4,300,592 | A | * | 11/1981 | Hartley | G05D 16/0658 137/505.25 |
| 4,431,020 | A | * | 2/1984 | Kowalski | F16K 1/123 137/486 |
| 4,543,985 | A | * | 10/1985 | Healy | G05D 16/0655 137/505.21 |
| 4,967,791 | A | * | 11/1990 | Sternberger | F16K 15/184 251/63.4 |
| 5,009,368 | A | ‡ | 4/1991 | Streck | B05B 3/0422 239/70 |
| 5,246,164 | A | ‡ | 9/1993 | McCann | A01G 25/16 239/11 |
| 5,257,646 | A | ‡ | 11/1993 | Meyer | G05D 16/0608 251/50 |
| 5,427,151 | A | ‡ | 6/1995 | Pauley | B01F 5/0077 137/505.25 |
| 5,732,735 | A | ‡ | 3/1998 | Birch | F17C 5/06 137/505.11 |
| 5,826,613 | A | * | 10/1998 | Schalk | F16K 1/123 137/554 |
| 5,860,447 | A | * | 1/1999 | Chu | G05D 16/103 137/493.9 |
| 5,875,815 | A | ‡ | 3/1999 | Ungerecht | G05D 16/0402 137/508 |
| 5,918,628 | A | * | 7/1999 | Harding | F16K 15/026 137/538 |
| 6,318,405 | B1 | * | 11/2001 | Brandt | G05D 16/0663 137/484.4 |
| 6,374,853 | B1 | ‡ | 4/2002 | Callies | G05D 16/0608 137/505.25 |
| 6,755,362 | B2 | ‡ | 6/2004 | Krieger | A01G 25/092 239/731 |
| 6,758,238 | B2 | ‡ | 7/2004 | Callies | G05D 16/0608 137/505.38 |
| 6,938,842 | B2 | ‡ | 9/2005 | Choat | A01G 25/092 239/728 |
| 7,048,001 | B2 | ‡ | 5/2006 | Youngberg | G05D 16/0608 251/359 |
| 7,401,622 | B2 | ‡ | 7/2008 | Ungerecht | G05D 16/0655 137/454.6 |
| 7,805,221 | B2 | ‡ | 9/2010 | Nickerson | A01G 25/16 239/69 |
| 8,567,433 | B2 | ‡ | 10/2013 | Ungerecht | F16K 1/123 251/252 |
| 8,678,029 | B2 | ‡ | 3/2014 | Ungerecht | F16K 1/123 251/61 |
| 9,128,489 | B2 | ‡ | 9/2015 | Bauman | G05B 19/0421 |
| 9,367,070 | B2 | ‡ | 6/2016 | Greenwood | G05D 16/0636 |
| 9,459,631 | B2 | ‡ | 10/2016 | Lawyer | G05D 16/0608 |
| 10,906,052 | B2 | ‡ | 2/2021 | Greenwood | G05D 16/02 |
| 11,048,280 | B2 | | 6/2021 | Duffin et al. | |
| 11,126,208 | B2 | * | 9/2021 | Nelson | F16K 15/08 |
| 11,144,077 | B2 | | 10/2021 | Weingarten | |
| 2004/0007269 | A1 | ‡ | 1/2004 | Larsen | G05D 16/106 137/505.25 |
| 2010/0032493 | A1 | ‡ | 2/2010 | Abts | A01G 25/092 239/11 |
| 2012/0285557 | A1 | ‡ | 11/2012 | Ungerecht | G05D 16/2095 137/528 |

FOREIGN PATENT DOCUMENTS

| | | | |
|---|---|---|---|
| JP | 2002039489 | A * | 2/2002 |
| JP | 3296481 | B2 * | 7/2002 |
| JP | 3637239 | B2 * | 4/2005 |

(56) References Cited

FOREIGN PATENT DOCUMENTS

JP      2006134213 A  *  5/2006
WO      2016/189466   ‡ 12/2016
WO      2018/163161      9/2018

OTHER PUBLICATIONS

King, B. A. et al., "A Variable Flow Rate Sprinkler For Site-Specific Irrigation Management," American Society of Agricultural Engineers ISSN 0883-8542, vol. 20(6), 20014, pp. 765-770.
International Search Report and Written Opinion dated Jul. 5, 2019 issued in PCT International Patent Application No. PCT/US19/27814, 15 pp.

* cited by examiner
‡ imported from a related application

MULTI-FUNCTION PRESSURE REGULATION VALVE

CROSS-REFERENCES TO RELATED APPLICATIONS

This application is a continuation-in-part (CIP) of U.S. patent application Ser. No. 16/386,899 filed Apr. 17, 2019, pending, which claims priority to U.S. Provisional Patent Application No. 62/658,968 filed Apr. 17, 2018, the entire contents of each of which are hereby incorporated by reference in this application.

STATEMENT REGARDING FEDERALLY SPONSORED RESEARCH OR DEVELOPMENT (Not Applicable)

FIELD

The invention relates to pressure regulators for liquid flow passages, and particularly to pressure regulators for supplying water to irrigation sprinklers and nozzles.

BACKGROUND

Irrigation systems often have many sprinklers and nozzles arranged along an extended water supply pipe. For example, a water supply pipe in a center pivot irrigation system may extend a quarter to half a mile (400 to 800 meters). The water supply pipe may have a diameter of six to ten inches (152 to 254 millimeters) and provide water for over a hundred sprinklers or nozzles arranged along the pipe. Similarly, solid set irrigation systems may include long rows of plastic water supply pipes placed between rows of crops with sprinklers on posts at regular locations along the supply pipes. Each sprinkler or nozzle is typically connected to the water supply pipe by a smaller water pipe that extends vertically and includes a pressure regulator.

The sprinklers and nozzles are typically designed to receive water under a relatively low pressure and within a narrow pressure range. There is a pressure regulator associated with each sprinkler or nozzle. Pressure regulators are in a water flow path between the water supply pipe and the sprinkler or nozzle. The pressure regulator maintains a uniform water pressure flowing to the sprinkler or nozzle. The pressure regulator ensures that the water pressure is within the design range of the sprinkler or nozzle.

Pressure regulators typically function solely to regulate the water pressure applied to a sprinkler or nozzle. They respond to the pressure at their inlet. If the pressure is too low, the pressure regulator may shut off flow through the regulator. As the water pressure at the inlet increases, the pressure regulator allows water to flow and ensures that the water pressure at its outlet remains generally constant.

Variable flow irrigation systems have been developed that provide variable water flow to nozzles and sprinklers. Variable flow irrigation systems provide precise control of the water applied by sprinklers and nozzles. Variable flow irrigation systems may be used to provide precise amounts of water, especially small amounts of water, for crops that are sensitive to too much or too little water. Variable flow control systems may also be used to adjust the amount of water flowing to certain regions of a field that tend to become too wet, such as a depression in the field.

Variable flow irrigation may be achieved by turning sprinklers or nozzles on and off in a repeating pattern such as on for 30 seconds and off for 30 seconds; on for 10 seconds and off for 20 seconds; and other patterns of on-off operation. Variable flow irrigation systems typically require a complex network of water flow valves to turn on and off the flow of water to each of the sprinklers and nozzles in the irrigation system. The costs and effort are large to add remotely controllable valves for each sprinkler and nozzle in an irrigation system.

Thus, there is a need for a less expensive and less complex system to provide variable flow irrigation, and particularly to turn on and off sprinklers or nozzles in accordance with prescribed patterns or cycles.

SUMMARY

The inventors conceived of and disclose here a pressure regulator which may be controlled, such as remotely, to turn on and off water flow in accordance with prescribed patterns or cycles through the regulator to the sprinkler or nozzle attached to the pressure regulator. A variable flow irrigation system is provided that uses a controllable pressure regulator and does not require an additional water flow control valve for each sprinkler or nozzle.

The pressure regulator includes a pressurizable chamber. Pressurizing the chamber causes a shuttle to move within the pressure regulator and shut off water flow into the plunger flow passage. Releasing the pressure in the chamber allows the shuttle to move and open the regulator to water flow. The pressure in the chamber may be controlled, such as remotely or according to a pre-programmed sequence of openings and closings. Thus, the pressure regulator may be controlled to turn on or off the water flow through the pressure regulator.

The chamber used to switch on and off the pressure regulator may be a sealed chamber which houses a spring, such as a helical spring, another type of mechanical spring or other deformable and resilient device. The chamber includes seals to allow for pressurization of the chamber. A pressurization port is added to the housing of the chamber. A supply of pressurized air or other pressurized fluid is coupled to the port. A controller determines when to pressurize the chamber. When the chamber is pressurized, a shuttle moves to close a water flow passage in the pressure regulator. When pressure is released from the chamber, the shuttle is displaced by water pressure at the inlet to the pressure regulator. The displacement of the shuttle opens the pressure regulator and allows water flow.

The pressure regulator continues to perform its usual function of regulating water pressure at the outlet from which water flows to the sprinkler or nozzle connected to the pressure regulator. The pressurization of the chamber does not interfere with the operation of the components in the pressure regulator, such as the plunger, mechanical spring and diaphragm all of which regulate the outlet water pressure.

An embodiment of the invention is a pressure regulator including: a housing including a flow passage; a plunger configured to move within the housing, wherein the plunger is hollow, and has a passage included in the flow passage; a valve seat in the housing and disposed in the flow passage immediately upstream of an inlet to the passage in the plunger; a shuttle within the housing configured to move between an upstream-most position at which the shuttle abuts the valve seat to close the flow passage and a downstream position displaced from the valve seat which opens the flow passage; a sealed chamber within the housing and between the plunger and the shuttle, wherein the sealed chamber is configured to be operated at pressures other than atmospheric pressure while the pressure regulator is operating as an on-off valve, and a port in the housing and open to the sealed chamber, wherein the port is configured to be connected to a source of a pressurized fluid.

In another embodiment, the invention is a liquid flow control device, which need not be a pressure regulator, and the liquid flow control device includes: a housing including a flow passage extending from an inlet, through the housing to an outlet; a plunger configured to move reciprocally within the housing along an axis of the plunger, wherein the plunger is hollow and defines a passage included in the flow passage of the housing; a valve seat in the housing and disposed in the flow passage immediately upstream of an inlet to the passage of the plunger; a shuttle within the housing and configured to move reciprocally with respect to both the housing and the plunger, wherein the shuttle has an upstream-most position within the housing at which the valve shuttle abuts the valve seat and closes the flow passage and a downstream position displaced from the valve seat and which opens the flow passage, a sealed chamber within the housing and between the plunger and the shuttle, wherein the sealed chamber is configured to be operated at pressures other than atmospheric pressure, and a port in the housing and open to the sealed chamber, wherein the port is configured to be connected to a source of a pressurized fluid.

In another embodiment, the invention is a method to control a pressure regulator, wherein the regulator includes a housing having a flow passage, a plunger defining a portion of the flow passage, and a sealed chamber between the plunger and a shuttle, wherein the method comprises:
(A) regulating water pressure in a water outlet portion of the flow passage by adjusting a gap between an inlet of the plunger and a valve seat fixed to the housing, wherein the gap is adjusted by movement of the plunger due to the water pressure in the water outlet portion acting on the plunger;
(B) moving the shuttle to seal against the valve seat and thereby close the flow passage, wherein the movement of the shuttle is driven by injecting a pressurized fluid into the sealed chamber; and
(C) moving the shuttle away from the valve seat to thereby open the flow passage, wherein the movement of the shuttle is driven by releasing the pressurized gas from the sealed chamber to reduce pressure in the chamber.

In another embodiment, the invention is a method to control a liquid control device including a housing having a flow passage extending through the housing from an inlet to an outlet, wherein the flow passage is partially defined by a hollow conduit within the housing, a shuttle, and a sealed chamber between the hollow conduit and the housing, wherein the method comprises:
(A) moving the shuttle within the housing to close a gap (G) between a valve seat in the housing and an inlet to the hollow seal conduit, wherein the movement of the shuttle is driven by injecting a pressurized fluid into the sealed chamber and wherein closing the gap closes the flow passage; and
(B) moving the shuttle away from the valve seat to thereby open the gap and allow liquid to flow into the inlet of the hollow conduit and from the outlet of the housing, wherein the movement of the shuttle is driven by releasing the pressurized fluid from the sealed chamber to reduce pressure in the sealed chamber.

BRIEF DESCRIPTION OF THE DRAWINGS

Other aspects, features, and advantages will be apparent from the following detailed description when taken in conjunction with the accompanying drawings, which are a part of this disclosure and which illustrate, by way of example, principles of this technology.

DETAILED DESCRIPTION

Figure 1:
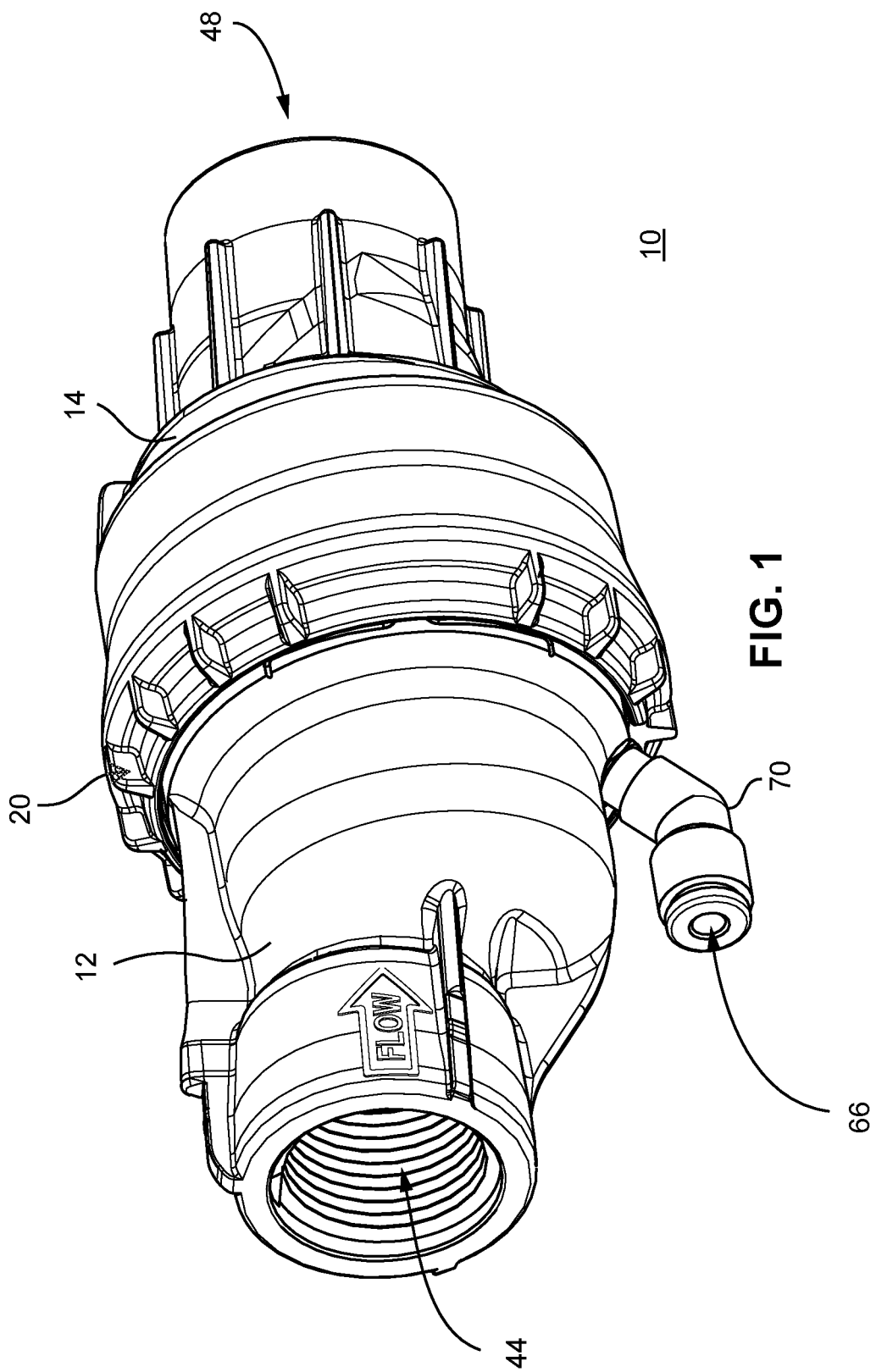
FIG. 1 is an inlet side perspective view of a pressure regulator with an internal chamber which may be pressurized to control the regulator.

FIGS. 1 to 5 show a flow-through type pressure regulator 10 in perspective, cross-sectional and exploded views, respectively. The pressure regulator 10 includes a housing 20 formed by an inlet cap 12 and an outlet cap 14. The inlet and outlet caps are connected by a snap connection, but may be connected by a threaded connection, friction fit connection or other connection. The connection may or may not allow the inlet and outlet caps to be separated after assembly of the pressure regulator.

The inlet cap 12 has an end portion with an annular connector 16 that may be formed by an annular row of teeth. Similarly, an end of the outlet cap 14 has an annular connector 18 at an end portion therefore. Each connector 16, 18 may have an annular row of teeth. The teeth of one connector slide between the teeth of the other connector when the inlet cap and outlet caps are pushed together.

Figure 2:
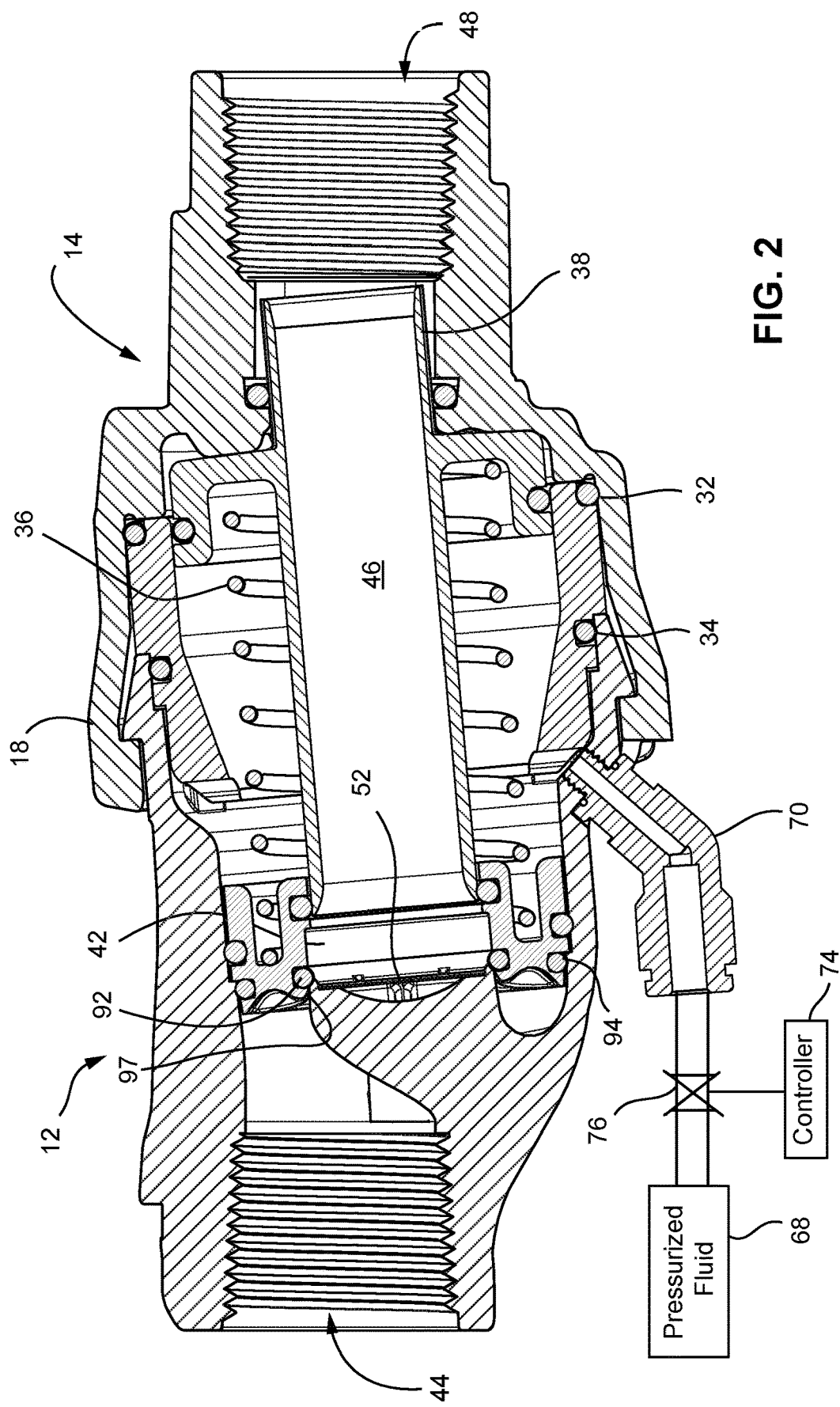
FIG. 2 is a cross-sectional view of the pressure regulator of FIG. 1, wherein the shuttle surrounds the valve seat to shut-off water flow through the pressure regulator.
Figure 3:
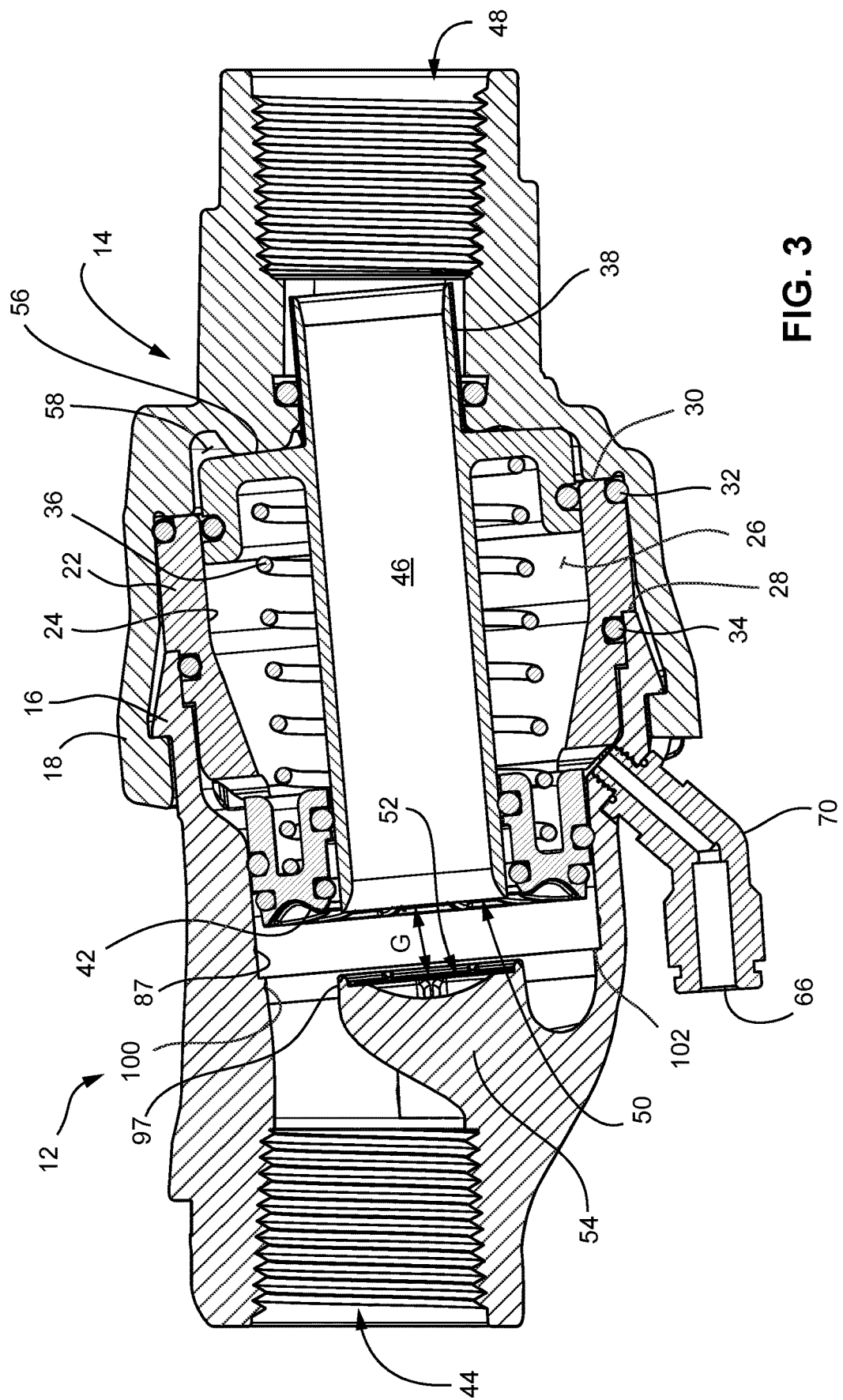
FIG. 3 is a cross-sectional view of the pressure regulator of FIG. 1.
Figure 4:
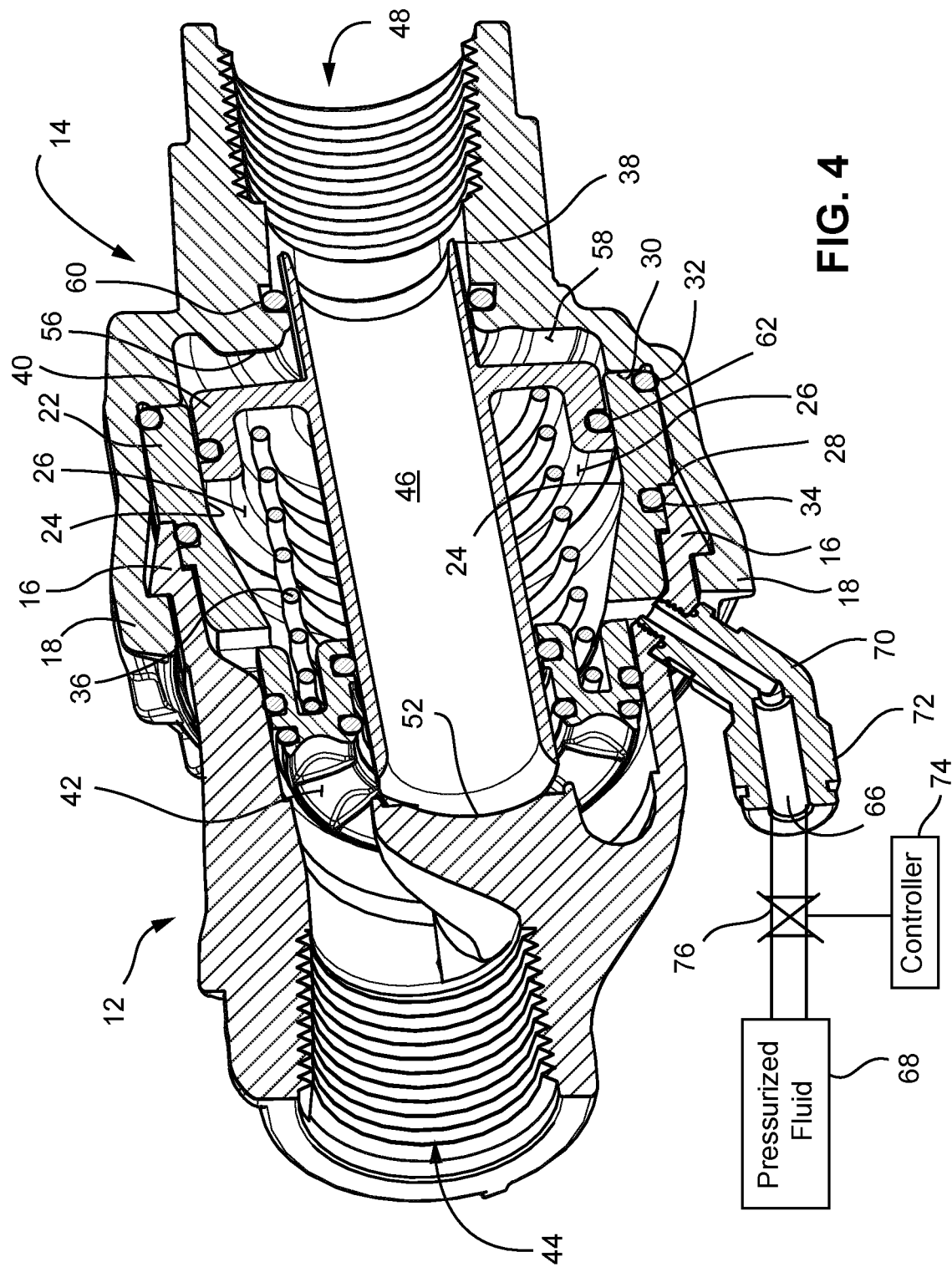
FIG. 4 is an inlet side perspective view of the pressure regulator of FIG. 1 shown in cross section.
Figure 5:
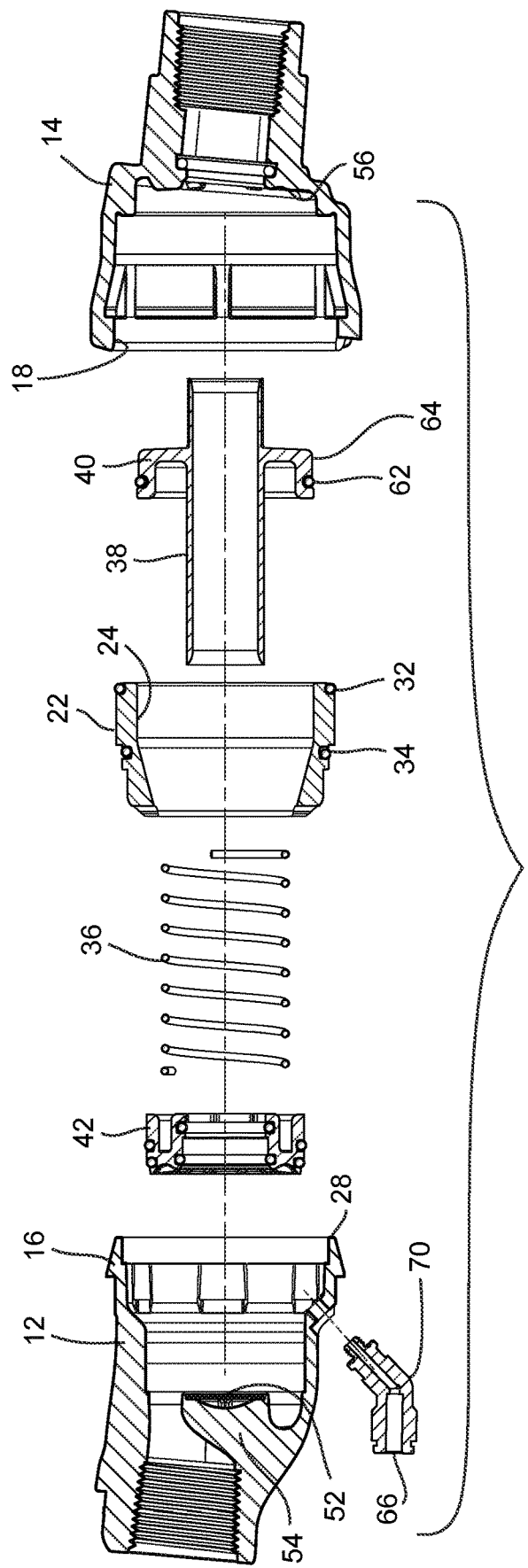
FIG. 5 is an exploded view of the pressure regulator of FIG. 1.

As shown in FIGS. 2 to 4, a hollow, annular liner 22 is housed by and is between the inlet and outlet caps. An inner surface 24 of the liner 22 forms a radially inward surface of a sealed chamber 26 within the pressure regulator. An outer surface of the liner 22 has an annular ledge 28 that abuts an annular edge of the connector 16 of the inlet cap 12. An annular end 30 of the liner abuts an annular ledge on the outlet cap 14. The liner 22 is secured in the pressure regulator by the inlet and outlet caps 12 and 14.

O-ring seals 32, 34 are in grooves or recesses in the outer surface of the liner 22. The O-ring seals prevent air or other fluid leaking from the sealed chamber 26, through gaps between the outer surface of the liner and the inner surfaces of inlet and outlet caps, and out to the atmosphere. The O-ring seal 32 is seated in a recess at the end 30 of the liner. The O-ring seal 32 is between the outer surface of the liner and the inner surface of the outlet cap 14. The O-ring seal 34 is in a groove in the outer surface of the liner and is between the liner and an inner surface of the inlet cap 12.

The sealed chamber 26 is in a region within the pressure regulator that has conventionally been used to house a coil spring 36. The sealed chamber 26 is bordered by the inner surface of the liner 22, the outer surface of a cylindrical plunger 38, an upstream surface of an annular flange 40 fixed to the plunger, and a downstream surface of an annular shuttle 42.

The coil spring 36 biases the flange 40 and its plunger 38 towards the outlet cap 14. The coil spring also biases the shuttle 42 towards the inlet cap. The plunger 38, with its flange 40, moves axially with respect to the chamber 26. Similarly, the shuttle 42 moves axially with respect to the chamber.

The movements of the shuttle 42 and the plunger 38, open or close the valve and regulate water flow through the pressure regulator 10, respectively. Water enters an inlet flow passage 44 in the inlet cap 12, passes through a plunger flow passage 46 in the plunger and out an outlet flow passage 48 in the outlet cap 14.

The flow through the pressure regulator 10 depends, in part, on the narrowest gap in the flow passages 44, 46 and 48 in the regulator. The narrowest gap (G) is formed between the inlet 50 of the plunger 38 and a valve seat 52, which is at the downstream end of a strut 54 extending from the inlet cap. The valve seat 52 may have a disc shape with an annular surface configured to abut against an entirety of a circular edge of the inlet 50 to the plunger.

The area of gap (G) varies depending on the position of the inlet 50 of the plunger 38. The gap is greatest while the plunger is displaced against an annular ledge 56 in the outlet cap. The gap (G) is narrowest, and can be substantially closed, if the circular edge of the inlet 50 to the plunger is against the valve seat 52. Movement of the plunger 38 changes the area of the gap (G) and thus water flow through the regulator.

Movement of the plunger 38 is driven by water pressure at the outlet flow passage 48. Water flowing through the outlet flow passage 48 seeps into a chamber 58 between the annular ledge 56 of the outlet cap and the flange 40 of the plunger. The water pressure in the chamber 58 is substantially the same as the water pressure in the outlet flow passage 48. As the water pressure in the outlet passage 48 increases, the water pressure also increases in the chamber 58. This increase in water pressure in chamber 58 displaces the flange 40 and plunger 38 towards the valve seat 52. As the water pressure in the chamber 58 becomes greater than the force of the spring 36 applied to the flange 40, the plunger is moved towards the valve seat. This movement reduces the gap (G) and restricts water flow through the regulator. Restricting water flow through the gap reduces the water pressure in the plunger flow passage 46 and the outlet flow passage 48. As the pressure reduces in the outlet flow passage 48, the pressure in the chamber 58 likewise reduces, and the plunger 38 slides from the valve seat. This interaction between the water pressure of the outlet flow passage 48, the movement of the plunger, and the width of the gap (G) which determines the water flow through the regulator provides a regulating function that maintains a generally uniform water pressure flowing from the outlet flow passage 48.

An O-ring 60 may be seated in a groove in the wall of the outlet flow passage 48. The O-ring is in the fluid passage between the outlet flow passage 48 and chamber 58. The O-ring 60 does not seal the fluid passage. Rather, the O-ring narrows the passage 48 and thereby slows the flow in and out of the chamber 58. By slowing the flow, the rate of pressure change in the chamber 58 is dampened to avoid too quick movements, e.g., vibration, of the plunger 38. The O-ring and its operation is described in detail in U.S. Pat. No. 5,257,646, which is incorporated by reference.

An O-ring seal 62 is in an annular outer wall 64 of the flange 40 of the plunger 38. The O-ring seal 62 prevents water or other fluid flow into or out of the sealed chamber 26 and into the chamber 58 between the flange 40 and the ledge 56 of the outlet cap. The O-ring seal 62 is retained in a groove in the outer wall 64 of the flange. The O-ring seal 62 slides against the inner surface 24 of the liner 22 as the plunger moves back and forth along its axis with respect to the liner 22. Other means may be used for preventing flow out or into the chamber 26 and between the liner 22 and the outer wall 64 of the flange 40 of the plunger. For example, a diaphragm extending from the flange 40 and liner 22 may be used to seal the chamber 26 housing the spring from the chamber 58 between the plunger flange 40 and the ledge 56 in the outlet cap 14.

The sealed chamber 26 is pressurized via a pressure port 66 that provides a fluid connection between the chamber 26 and a source of a pressurized fluid 68, such as a source of pressurized air. The port may be a conduit extending through a stem 70 attached to a sidewall of the inlet cap 12. The stem 70 includes a connector 72 that may connect to a hose linking the pressurized fluid source 68 to the port 66. The outlet of the port is open to the sealed chamber 26.

The shuttle 42 may be configured to operate as an on-off valve for water flow through the pressure regulator 10. To shut off water flow, the shuttle 42 moves upstream to the valve seat 52. The shuttle has an inner wall that slides over an outer rim of the valve seat 52 and its strut 54.

The sealed chamber 26 may be pressurized from the source of a pressurized fluid 68 to move the shuttle 42 to the off position such that the shuttle covers the valve seat 52 and thereby closes the water flow passage into the inlet 50 to the plunger flow passage 46. To close the pressure regulator, the pressure in the sealed chamber must be sufficient to overcome the water pressure in the inlet flow passage 44 that acts on the front face of the shuttle 42. The force of the spring 36 assists the force applied by the pressure in the sealed chamber 26 to move the shuttle to the closed position.

To open the water flow passage, pressure in the sealed chamber 26 is released by venting through the port 66 to the atmosphere or a vacuum. Releasing the pressure allows the sealed chamber 26 to be near or below atmospheric pressure, when the chamber 58 is not pressurized, the water pressure in the inlet flow passage 44 overcomes the force of the spring 36 and moves the shuttle 42 in a downstream direction and thereby opens the flow passage.

By controlling the pressure in the sealed chamber 26, the shuttle 42 may be moved to turn on and off water flow through the pressure regulator 10. The pressure in the sealed chamber 26 may be controlled by a controller 74 that actuates a valve 76 connected to the port 66 for the sealed chamber. The valve may have an open position that allows pressurized fluid from the source of the pressurized fluid 68 to flow into the sealed chamber 26, and a vent position that allows pressure from the sealed chamber 26 to vent to the atmosphere. The valve may also have a closed position that prevents gas flowing out of the port 66.

The controller 74 may be a computer control system or processor that communicates via a wired or wireless link with a respective valve 76 for each of the pressure regulators in an irrigation system. Similarly, a valve 76 may control the fluid pressure applied to a group of pressure regulators. The valve 76 for each pressure regulator or group of regulators may include an actuator which is controlled by the controller and turns the valve to its different positions.

The controller 74 may be configured to control each pressure regulator 10 to turn on and off water flow in accordance with a schedule set by an operator or set in accordance with the agriculture crop to be irrigated or the field to be irrigated. For example, the schedule may be that for every 30-second interval the pressure regulator allows water flow for a certain period, such as 20 seconds, and turns off the water flow for 10 seconds. This schedule of turning on and off water flow may be used for all the pressure regulators in an irrigation system. The schedule is achieved by having the controller 74 command the valves 76 for all the pressure regulators to pressurize and vent the sealed chambers in the pressure regulators based on the schedule.

The shuttle may function as an automatic shut-off for the pressure regulator. This automatic shut-off function is independent of the controller and is operable while the sealed chamber 26 is near or below atmospheric pressure. The shut-off function may be to shut off water flow through the pressure regulator automatically when the water pressure at the inlet passage 44 falls below a threshold pressure level.

The automatic shut-off operates based on the force the spring 36 applies to the shuttle 42. The shuttle 42 is biased by the spring 36 towards an upstream position that shuts off water flow through the pressure regulator. If the water pressure at the inlet flow passage 44 is not sufficient to overcome the spring force applied to the shuttle, then the spring 36 keeps the shuttle 42 biased in an upstream direction and thereby closes the gap between the plunger inlet 50 and the valve seat 52. The shuttle is moved from the shut-off position by water pressure in the inlet flow passage 44 that acts on the front face of the shuttle. As the water pressure increases in the inlet flow passage, the shuttle 42 is moved towards a downstream position that creates an opening between the shuttle, the valve seat 52 and the inlet 50 of the plunger 38. This opening allows water to flow through the pressure regulator 10. The water pressure at the inlet flow passage 44 needed to move the shuttle 42 and thereby open the pressure regulator to water flow may be a predetermined threshold pressure level. Thus, the shuttle may be configured to shut off water flow through the pressure regulator 10 while the water pressure at the inlet flow passage 44 is below the threshold pressure level.

Pressurizing the sealed chamber 26 with enough pressure from the source of the pressurized fluid 68 will overcome the water pressure in the inlet flow passage and move the shuttle 42 to an upstream position to stop water flow.

Figure 6:
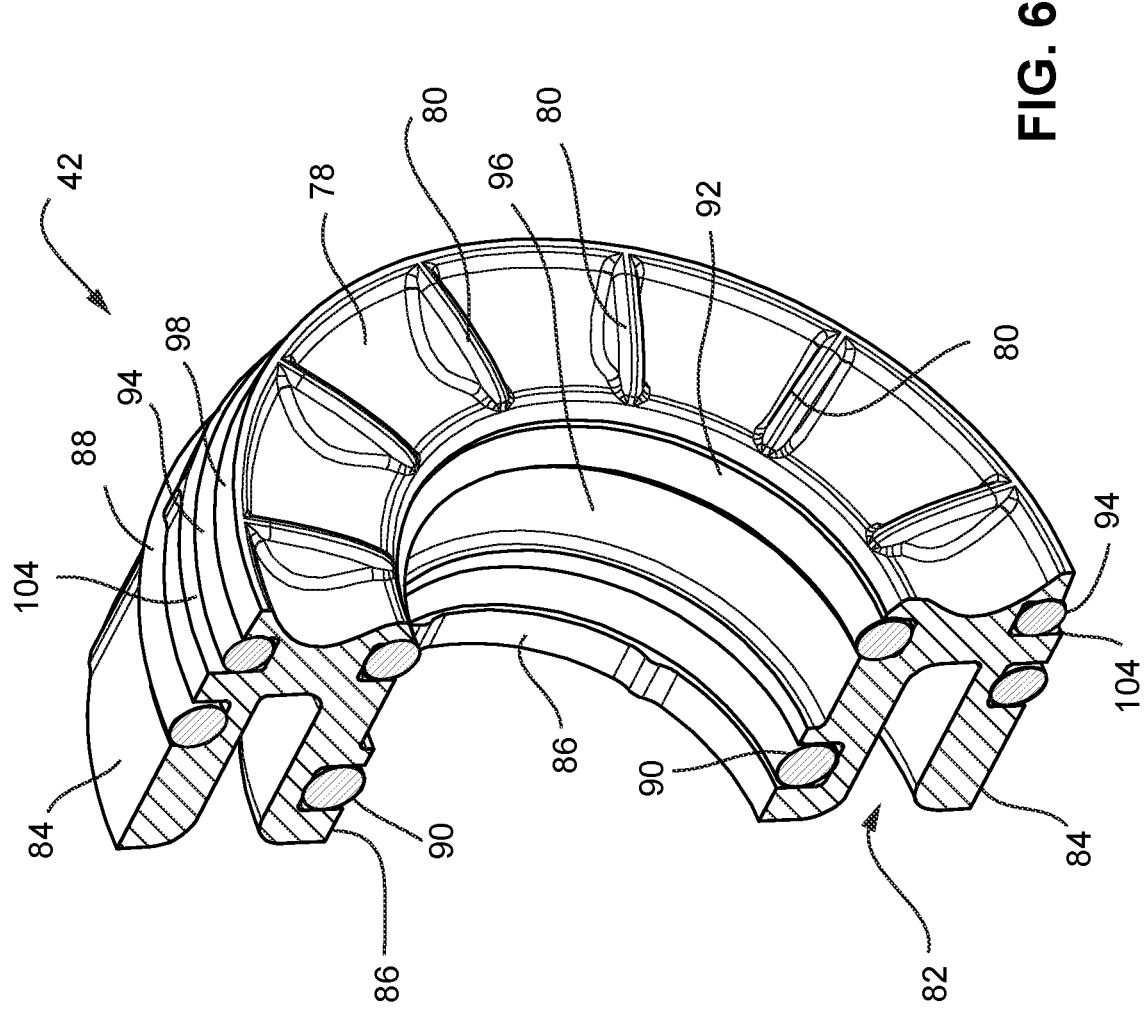
FIG. 6 is a cross-sectional view of the shuttle for the pressure regulator of FIG. 1.

FIG. 6 shows the shuttle 42 in partial cross section and in a perspective view. The shuttle 42 includes a front face 78 that faces upstream towards the water flow coming through the inlet flow passage 44. The front face 78 is annular and may have a concave shape in cross section. Ribs 80 may be arranged symmetrically around the front face 78. The concave shape of the front face and the ribs 80 assist in directing water from the front face radially inward towards a gap between the shuttle and the valve seat. An annular slot 82 in the rear of the shuttle 42 is configured to receive the coil spring 36.

The shuttle 42 has an outer cylindrical surface 84 and an inner cylindrical surface 86. Both surfaces 84, 86 have grooves to receive respective O-ring seals 88, 90. The O-ring seal 88 in the annular groove on outer cylindrical surface 84 forms a water tight seal between the shuttle and an inner cylindrical surface 87 (FIG. 3) of the inlet cap 12. The O-ring seal 90 in the annular groove on the inner cylindrical surface 86 forms a water tight seal between the shuttle 42 and an outer cylindrical surface (FIG. 3) of the plunger 38. These O-ring seals 88, 90 remain in their respective grooves of the shuttle and slide against the surfaces of the inlet cap or plunger.

The shuttle 42 also includes a second set of O-ring seals 92, 94 that assists in providing a water tight seal with the valve seat 52 while the shuttle is its upstream-most position in the inlet cap 12. The O-ring seal 92 is in a groove on an inner cylindrical surface 96 which has a larger diameter than does the inner radial surface 86 which seats the O-ring seal 90. O-ring seal 92 has a larger diameter and is radially outward of the other O-ring seal 90 on the inner surface 86 of the shuttle 42. Because of its larger diameter, the O-ring seal 92 does not abut or slide against the outer surface of the plunger 38. The O-ring seal 92 is sized to form a seal with an outer cylindrical surface 97 (FIG. 3) at the downstream end of the strut 54. The O-ring seal 92 engages the surface 97 of the strut 54 only while the shuttle 42 is in the upstream-most position. The O-ring seal 92 forms a water tight seal against the surface 97 of the strut, while the shuttle is in the upstream-most position. The O-ring seal 92 does not form a water tight seal while the shuttle 42 is moved downstream and the O-ring seal 92 is not engaged with the surface 97 of the strut.

The O-ring seal 94 is seated in a groove 104 (FIG. 6) in an outer cylindrical surface 98 of the shuttle 42, which is radially inward of the outer cylindrical surface 84. The O-ring seal 94 has a smaller diameter and is radially inward of the O-ring 88. Thus, O-ring seal 94 does not abut and does not slide against the same cylindrical surface 87 against which slides O-ring 88. The O-ring seal 94 engages and seals against a cylindrical surface 100 (FIG. 3) on the inlet cap and in the inlet flow passage 44. The surface 100 has a narrower diameter than the cylindrical surface 87 which is also on the inlet cap and in the inlet flow passage 44. A small annular step 102 or ramp transitions the inlet flow passage between the surfaces 87 and 100. The O-ring seal 94 abuts and forms a water tight seal with the cylindrical surface 100 while the shuttle 42 is at the upstream-most position.

It may be desired for the shuttle to move quickly between the shut-off and open positions. Similarly, it may be desirable to avoid a position in which the shuttle is, for extended periods, in an intermediate position between the upstream-most and downstream-most positions. If left in an intermediate position, the shuttle may reduce water flow through the pressure regulator in an undesired manner.

The O-ring seal 94 and annular step 102 assists in transitioning the shuttle from a shut-off position (where the shuttle is in the most upstream position) to an open position (where the shuttle is moved to a downstream-most position). As the shuttle moves from the upstream-most position, the O-ring seal 94 slides away from the inner surface 100 on the inlet cap, water flows around the O-ring seal and acts on the annular step 102 in addition to the front face 78 of the shuttle 42. Because the surface area facing the water flow is increased by the step 102, the force applied by the water to the shuttle similarly increases as the O-ring seal slides from the inner surface 100. The increase in the force applied by the water to the shuttle acts to move the shuttle quickly to the downstream-most position.

The invention may also be embodied as a flow control device that does not regulate the pressure of liquid, such as water, flowing through the device. The structure of such a device may be the same as shown in FIGS. 1 to 6, except that the plunger need not move with respect to the housing. For example, the plunger may be fixed in position in the housing, e.g., inlet cap and outlet cap, by the liner 22 and outlet cap 14. If the plunger is fixed to the housing, the plunger is not capable of moving axially towards the valve seat and thereby regulating a pressure drop through the gap (G) between the inlet 50 of the plunger 38 and the valve seat 52. If the plunger is fixed, it may be a fixed flow conduit or flow tube within the housing.

Figure 7:
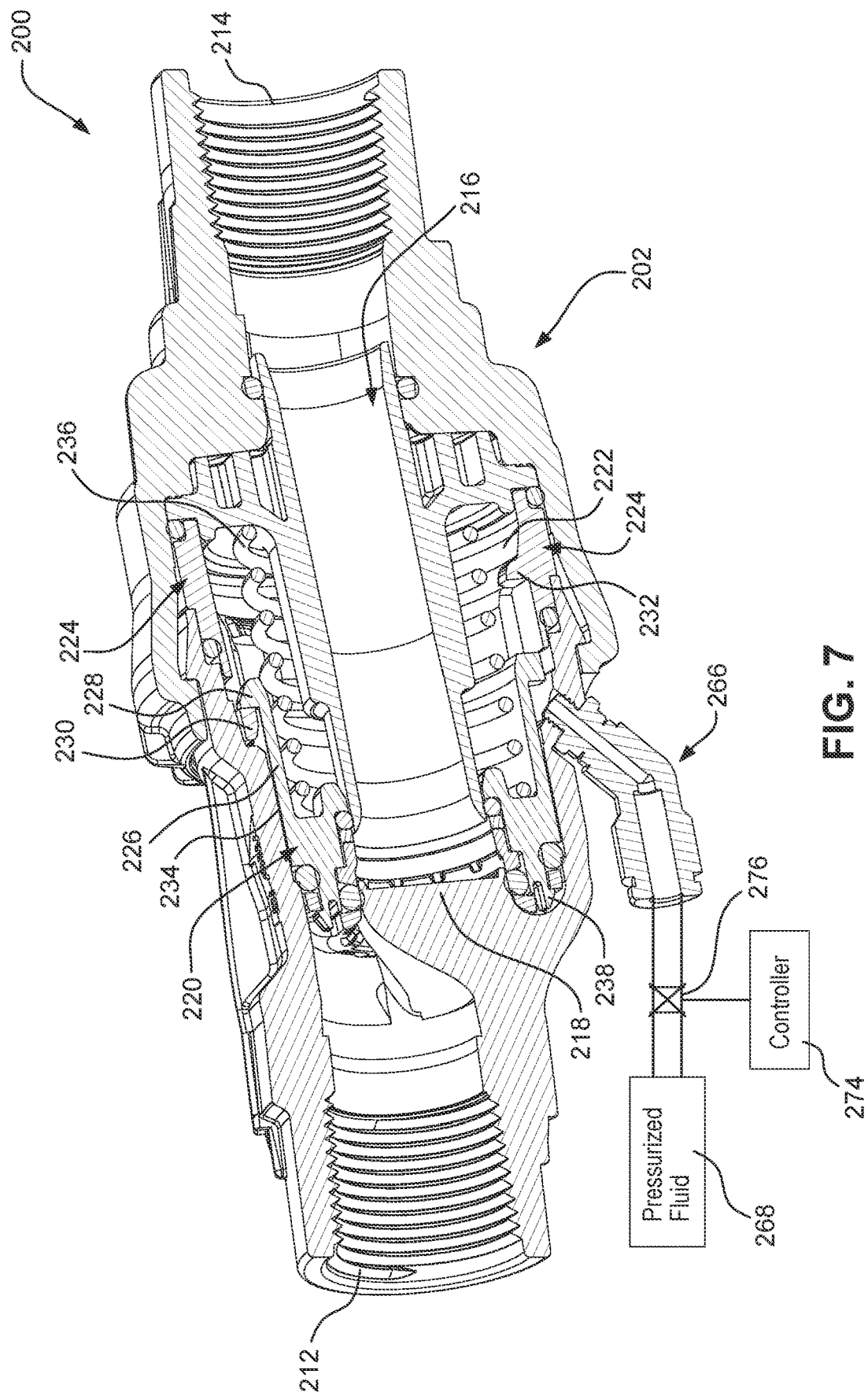
FIGS. 7 and 8 are cross-sectional views of a flow control device according to an alternative exemplary embodiment.
Figure 8:
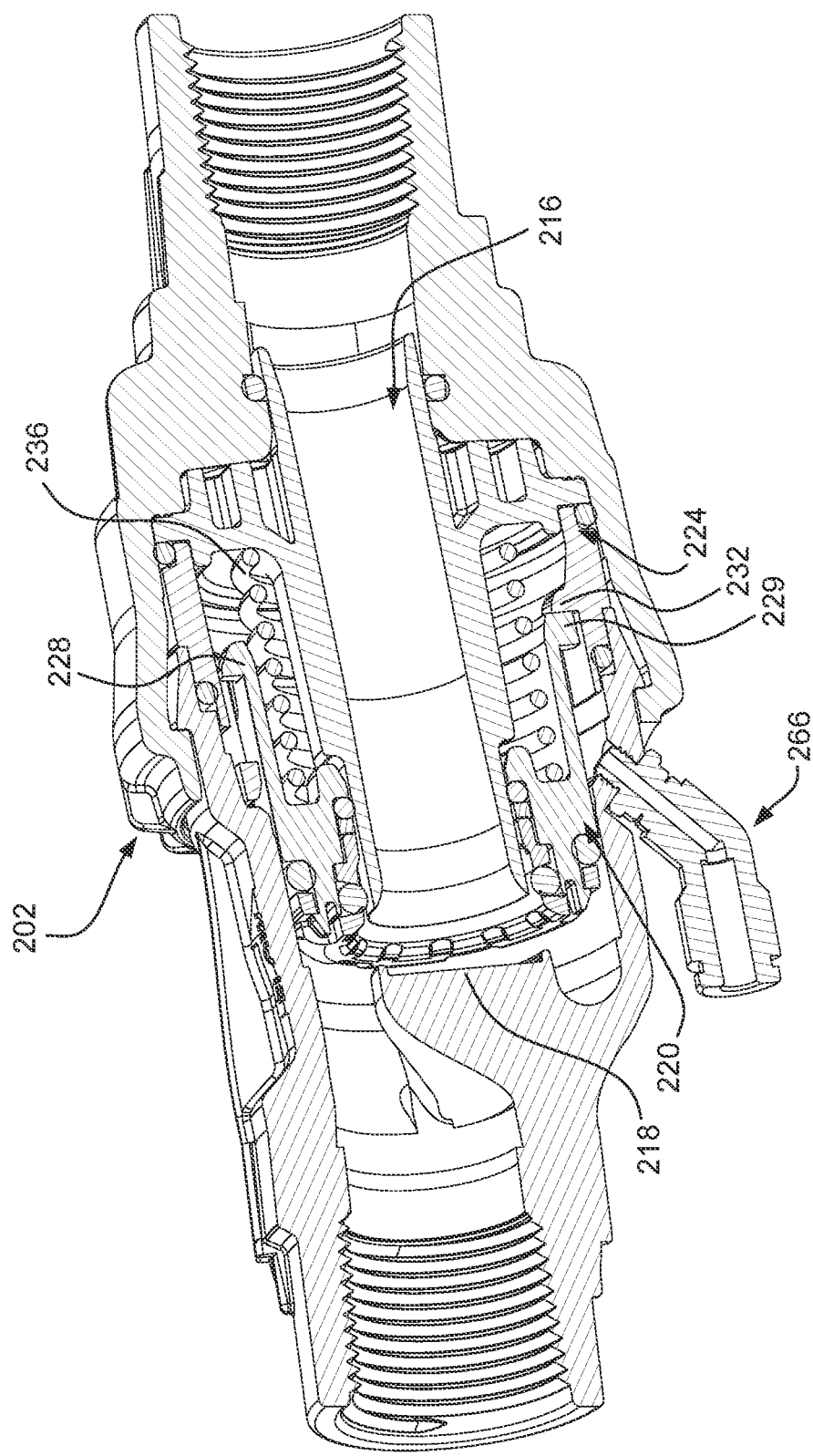

FIGS. 7 and 8 are cross-sectional views of a flow control device with a fixed flow conduit. The flow control device 200 includes a housing 202 with an inlet 212 and an outlet 214. A flow conduit 216 is disposed in the housing 202, where the inlet 212, the flow conduit 216 and the outlet 214 define a flow passage. A valve seat 218 is disposed in the housing 202 downstream of the inlet 212. Features and details similar to those from the embodiment shown in FIGS. 1-6 will not be redescribed.

A shuttle 220 is movably disposed in the housing 202 and is displaceable between a closed position engaging the valve seat 218 (FIG. 7) to close the flow passage and an open position spaced from the valve seat 218 (FIG. 8) to open the flow passage. A sealed chamber 222 is defined between the housing 202 and the flow conduit 216. Similar to the embodiment described in respect of FIG. 4, the sealed chamber 222 may be pressurized via a pressure port 266 that provides a fluid connection between the chamber 222 and a source of pressurized fluid 268, such as a source of pressurized air. The pressure in the sealed chamber 222 may be controlled by a controller 274 that actuates a valve 276 connected to the port 266 for the sealed chamber. The fluid source 268, the controller 274 and the valve 276 can be included in all the embodiments incorporating the pressure port 266.

In the embodiment shown in FIGS. 7 and 8, the flow conduit 216 is fixed in the housing 202. As such, the flow control device 200 acts as an open/close valve (i.e., without pressure regulation).

A liner 224 may be fixed in the housing 202 and positioned between the housing 202 and the sealed chamber 222. The shuttle 220 includes a downstream annular rim 226 including one or more lugs 228 as well as one or more rigid lugs 229. The liner 224 includes an upstream stop 230 with which the lug 228 engages when the shuttle 220 is displaced to the closed position as shown in FIG. 7. The liner 224 also includes a downstream stop 232 with which the rigid lug 229 engages when the shuttle 220 is displaced to the open position as shown in FIG. 8.

A spring 236, similar to the spring 36 of the first embodiment, acts between the flow conduit 216 and the shuttle 220. The spring 236 biases the shuttle 220 toward the closed position.

With continued reference to FIG. 7, the housing 202 includes a cylindrical guide surface 234. The downstream annular rim 226 of the shuttle 220 bears against the cylindrical guide surface 234. The shuttle 220 is also provided with an upstream annular rim 238 positioned radially inward of the downstream annular rim 226. The upstream annular rim 238 engages the valve seat 218 when the shuttle 220 is displaced into the closed position.

Figure 9:
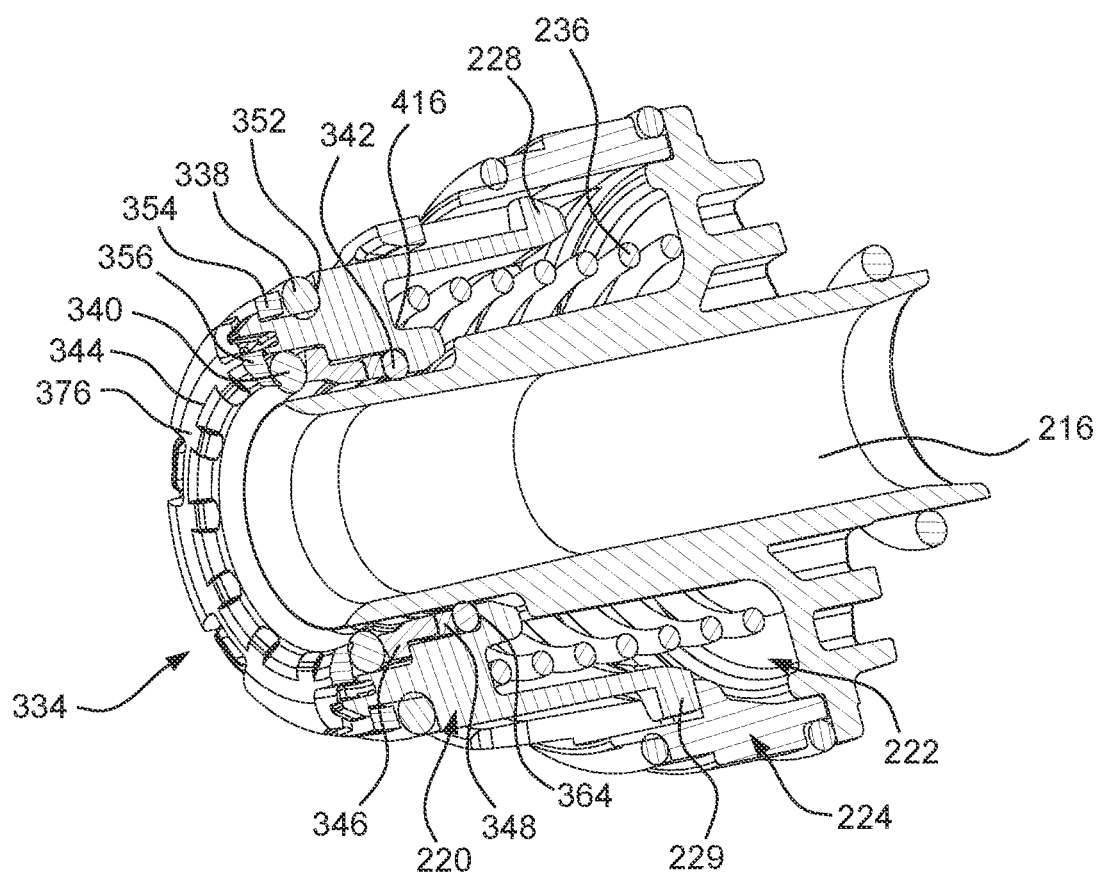
FIG. 9 is a cross-sectional view showing details of the shuttle and liner interacting with the flow conduit in FIGS. 7 and 8.

Details of the shuttle 220 and associated seals and the liner 224 will be described with reference to FIGS. 9 and 10.

The shuttle 220 forms part of a shuttle assembly 334. The shuttle assembly 334 includes an outer annular seal 338, such as an O-ring, that forms a watertight seal between the assembly 334 and an inner wall of the housing 202 to prevent leakage of water into the chamber 222. The shuttle assembly 334 also forms a watertight seal, via a second inner annular seal 342, such as an O-ring, with the flow conduit 216 to prevent leakage of water into the chamber 222. These watertight annular seals 338, 342 are maintained while the shuttle assembly moves between its forward (i.e., upstream) and rearward (i.e., downstream) positions (and while the flow conduit 216 moves axially when not fixed in the housing 202).

While in the forward position, the shuttle assembly 334 forms a watertight seal, via a first inner annular seal 340, such as an O-ring, with the seat to prevent water leakage. The watertight seal with the valve seat is released when the shuttle assembly 334 moves to the rearward position. The seal between the shuttle assembly 334 and the valve seat 218 is formed by the first inner annular seal 340 that is repeatedly formed and released as the shuttle assembly 334 moves to close and open water flow through the flow control device.

The shuttle assembly 334 includes the shuttle 220 that supports the annular seals 338, 340, 342. These annular seals are mounted to a forward region of the shuttle 220. The annular seals 338 and 340 are held in place on the forward region by a first annular seal support 344 and a second annular seal support 346. The second inner annular seal 342 is held in place between a third annular seal support 348, which is held in place by the second annular seal support 346, and an annular ledge 364. The annular seals may be formed of elastic materials, such as rubber, plastics, polybutadiene, or polyurethane.

The outer annular seal 338 slides across the cylindrical guide surface 234 of the housing 202 as the shuttle assembly 334 moves between the forward and rearward positions. The outer annular seal 338 seats on an annular ledge 352 in an outer surface of the shuttle 220. The outer annular seal 338 is sandwiched between the ledge 352 and an outer lip 354 of the first annular seal support 344. The outer annular seal 338 is held in place by the ledge 352, an annular wall of the shuttle adjacent the ledge 352, the outer lip 354 of the first annular seal support 344, and the inner wall of the housing 202.

The first inner annular seal 340 is held between an annular inner lip 356 on the first annular seal support 344, and an annular upper lip of the second annular seal support 346. The inner lip and the upper lip both extend radially inward a distance greater than a radius of a cross section of the first inner annular seal 340 but less than the diameter of the first inner annular seal 340. The lips also extend towards each other, e.g., converge in a radially inward direction, to grasp the first inner annular seal 340. The inner circumferential surface of the first inner annular seal 340 is unsupported by the valve seat while the shuttle assembly 334 is in the rearward position. While the inner circumferential surface of the first inner annular seal 340 is unsupported, the converging lips securely hold the first inner annular seal 340 within the shuttle assembly 334. By securely holding the first inner annular seal 340, the converging lips ensure that the first inner annular seal 340 is not dislodged from the shuttle 220 as the first inner annular seal 340 moves in and out of contact with the valve seat 218.

The second inner annular seal 342 forms a seal between the shuttle assembly 334 and an outer surface of the flow conduit 216. The second inner annular seal 342 remains in contact with the flow conduit 216 as the flow conduit 216 and shuttle assembly move relative to each other. The second inner annular seal 342 may have a circumference and cross-sectional area smaller than that of the first inner annular seal 340. The first inner annular seal 340 has a larger circumference because it fits around and seals with the valve seat 218 and particularly around the end of the strut that forms the valve seat 218. The second inner annular seal 342 has a smaller circumference because it fits around and seals with the flow conduit 216, which may have an outer diameter narrower than the diameter of the valve seat 218.

The second inner annular seal 342 is positioned in the shuttle assembly 334 such that the annular seal always remains in sliding contact with the flow conduit 216 while the shuttle assembly 334 moves relative to the flow conduit 216, allowing the flow conduit 216 to move axially with respect to the second inner annular seal 342 (when the flow conduit is movable in the housing).

To ensure that the second inner annular seal 342 is always in contact with the flow conduit 216, the axial distance between the first inner annular seal 340 and the second inner annular seal 342 should be substantially greater than the gap between the valve seat 218 and the inlet to the flow conduit 216, while the flow conduit 216 is in the rearward position. The distance between the first and second inner annular seals 340, 342 may be in a range of 120-175 percent of the gap while the flow conduit 216 is in the rearward position.

The axial distance between the first and second inner annular seals 340, 342, may be set by the axial lengths of the second annular seal support 346 and the third annular seal support 348. The second annular seal support 346 and third annular seal support 348 are mounted in the shuttle 220 such that they are coaxial with the shuttle 220 and adjacent each other in the shuttle 220. The second annular seal support 346 and third annular seal support 348 may be combined into a single one-piece component.

The second inner annular seal 342 is supported in the shuttle 220 by being sandwiched between the inner annular ledge 364 of the shuttle 220 and the third annular seal support 348. The third annular seal support 348 is seated in the shuttle 220 and has an outer surface adjacent an inner cylindrical surface on the shuttle.

The inside cylindrical surface of the third annular seal support 348 and an inside surface of the second annular seal support 346 may have the same diameter. These diameters are slightly greater, such as by 103-115 percent, than the inside diameter of the second inner annular seal 342, to avoid abutting the outer surface of the flow conduit 216. The second annular seal support 346 includes a second inside cylindrical surface that has a larger diameter than the first inside surface as shown, such as in a range of 103-115 percent larger. The larger diameter of the second inside surface serves to accommodate the larger inner diameter of the first inner annular seal 340. The larger diameter of the second inside surface avoids having the second annular seal support 346 abut the outer surface of the seat 218 while the shuttle assembly 334 is in a forward position.

The annular front surface 376 of the shuttle assembly 334 faces the water flowing from the inlet flow passage and into the inlet of the flow conduit 216. The annular front surface 376 moves relative to the inlet of the flow conduit 216 due to the movements of the flow conduit 216 and/or the shuttle assembly 334. The front surface 376 is annular and may be curved in radial directions with respect to the axis of the flow conduit 216. The annular front surface 376 may have shallow grooves oriented radially. The curved surface and grooves direct water flowing over the front surface 376 towards the inlet to the flow conduit 216.

The annular front surface 376 is not always aligned with the inlet of the flow conduit 216 due to the relative movements of the shuttle assembly 334 and the flow conduit 216. The front surface is forward of the inlet to the flow conduit 216 while the shuttle assembly 334 is in the forward position. The front surface is rearward of the inlet to the flow conduit 216 while the shuttle assembly 334 is in the rearward position. The front surface 376 may be aligned with the inlet to the flow conduit 216 only while the flow conduit 216 and the shuttle assembly 334 are in their rearward positions.

The downstream annular rim 226 extends from the annular ledge 352 of the shuttle 220 rearward to the lugs 228 of the shuttle 220. The downstream annular rim 226 extends the shuttle assembly 334 rearward to assist in keeping the opening aligned with the seat 218 as the assembly moves forward towards the seat 218. The downstream annular rim 226 also aids in providing smooth sliding of the shuttle assembly 334 in the housing 202 and prevents the assembly from becoming stuck as it moves forward and rearward. The downstream annular rim 226 may be one-half to three quarters or more of the entire axial length of the shuttle assembly 334.

The sliding engagement between the downstream annular rim 226 and the cylindrical guide surface 234 serves to keep the shuttle assembly 334 aligned with the valve seat 218 as the shuttle assembly 334 slides between its forward and rearward positions and aids in preventing the assembly 334 from becoming angularly offset from the cylindrical guide surface 234.

The liner 224 has an inner cylindrical surface that receives and forms a bearing surface with respect to the outer surface of the downstream annular rim 226. The sliding engagement between the liner and the downstream annular rim 226 aids in keeping the shuttle assembly 334 aligned with the liner and the valve seat 218.

Figure 10:
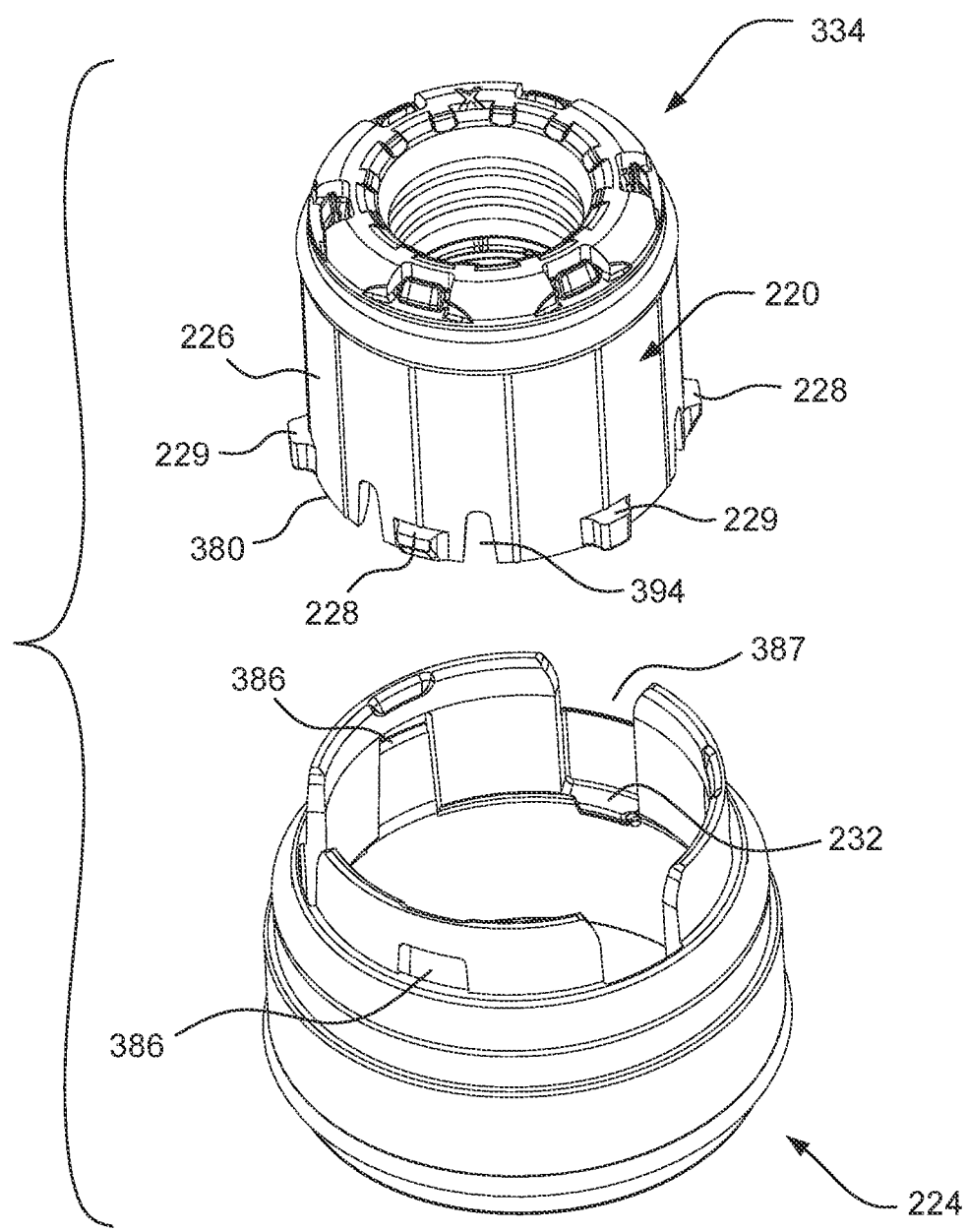
FIG. 10 is an exploded view of the shuttle assembly and liner.

As shown in FIG. 10, the liner 224 includes closed slots 386 and open slots 387 both oriented parallel to the axis of the flow conduit 216. The closed slots 386 receive the lugs 228 extending radially outward from the shuttle 220. A forward end of the closed slots 386 engages the lugs 228 to prevent further forward axial movement of the shuttle 220 and the shuttle assembly 334. The closed slots 386 prevent the shuttle assembly 334 from moving too far forward, and thereby becoming stuck in the housing 202. The closed slots 386 also substantially suppress rotational movement of the shuttle assembly 334 within the liner 224. Suppressing rotational movement reduces the risk that the annular seals 338, 340, 342 are subjected to angular forces that could cause the annular seals to break their watertight seals or become damaged.

The open slots 387 in the liner 224 may include a reinforced rear end that stops rearward movement of the shuttle assembly 334 by engaging the bottom end 380 of the shuttle and/or rigid lugs 229. The reinforcement may be a flange at the end of the slot.

Slots 394 in the shuttle 220 allow the lugs 228 to bend inward as the shuttle 220 is inserted into the liner 224 during assembly of the flow control device. During operation of the flow control device, the lugs 228 are not intended to escape from the closed slots 386 in the liner 224. As shown, in some embodiments, three of the lugs 229 are rigid and are inserted into the open slots 387, and as such, these rigid lugs 229 do not require spring relief slots. The lugs 228 utilize the slots 394 to deflect inward past the end of the closed slots 386.

Figure 11:
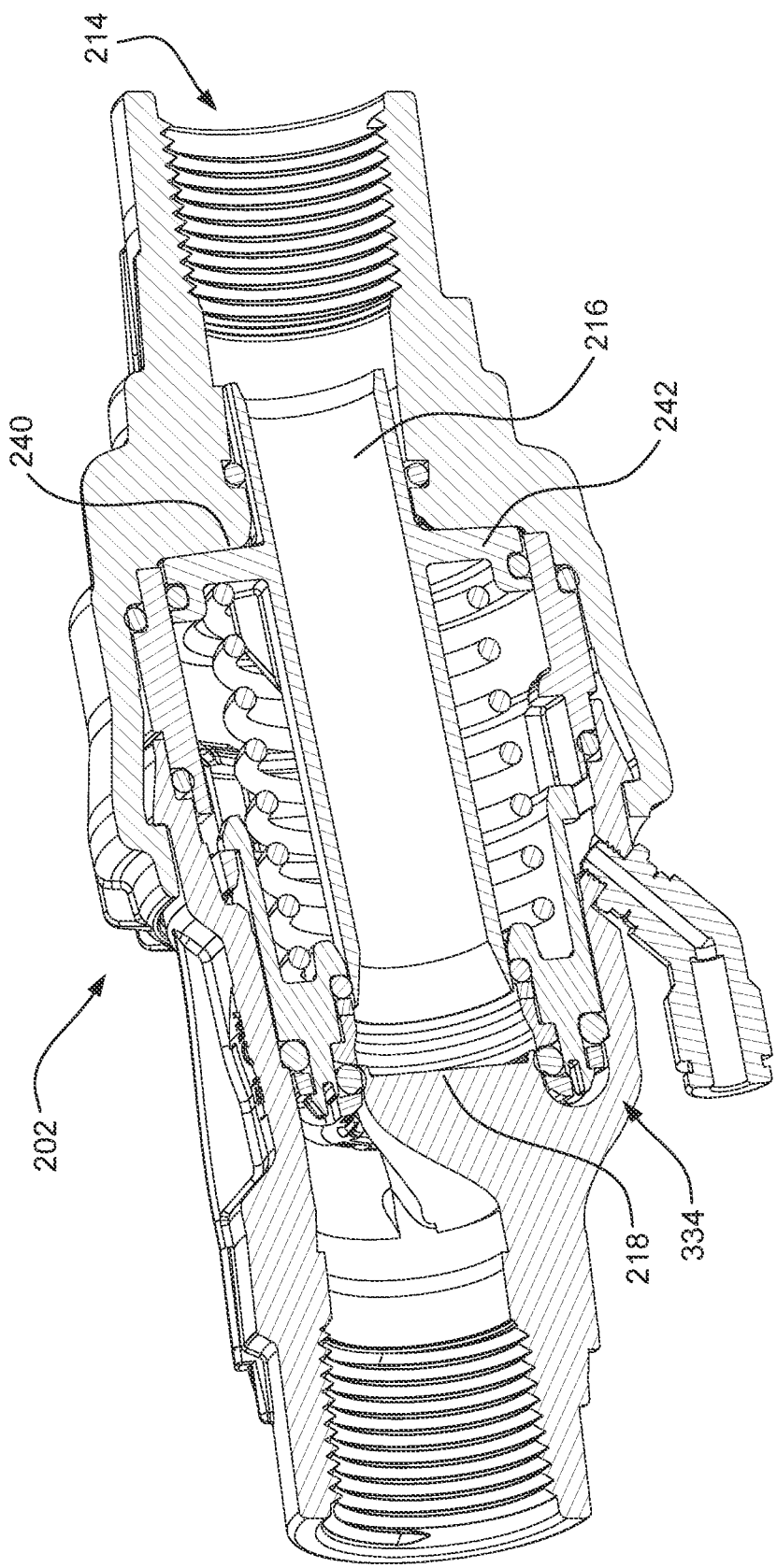
FIGS. 11-13 are cross-sectional views of a flow control device including the shuttle and liner of FIGS. 7 and 8 with pressure regulation.
Figure 12:
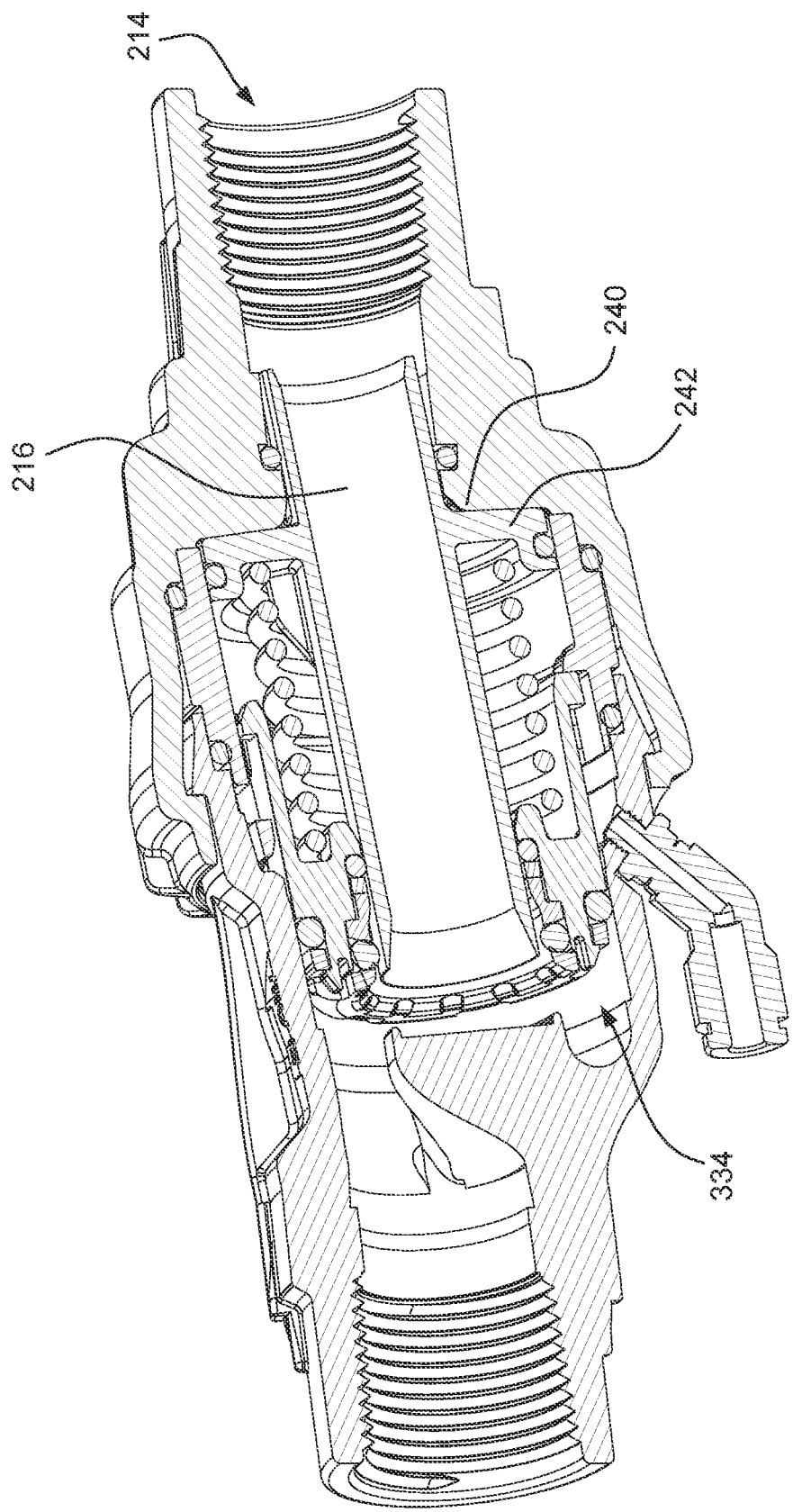
Figure 13:
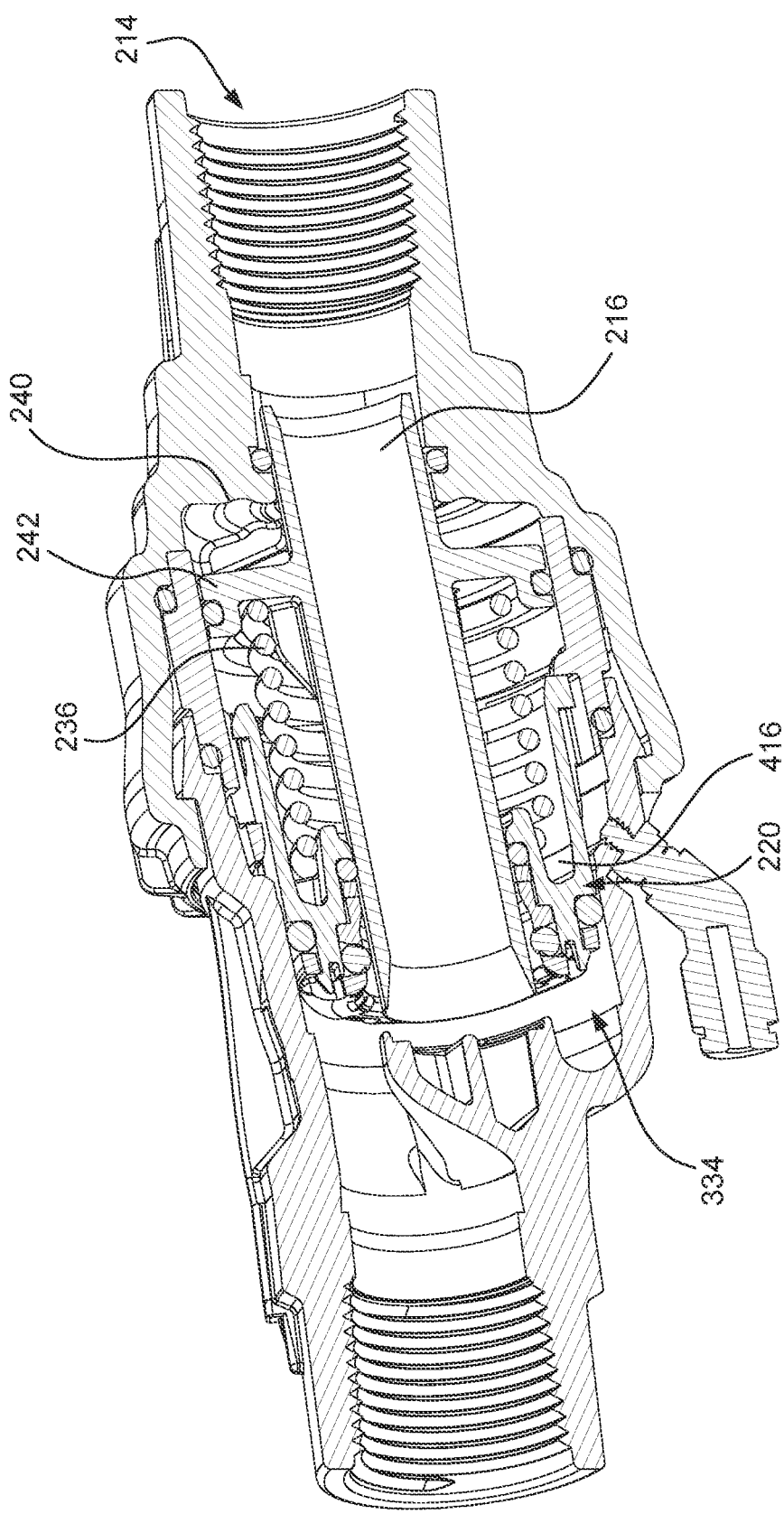

With reference to FIGS. 11-13, in some embodiments, the flow conduit 216 is in the form of a plunger that is displaceable in the housing 202 between a full gap position and a reduced gap position (consistent with the embodiment described in respect of FIGS. 1-6). FIG. 11 shows the shuttle assembly 334 in the closed position engaging the valve seat 218 with the flow conduit/plunger 216 in the full gap position. FIG. 12 shows the shuttle assembly 334 in the open position with the flow conduit/plunger 216 in the full gap position.

With reference to FIG. 13, the housing 202 may include a downstream shoulder 240 upstream of the outlet 214. The plunger 216 includes an annular ledge 242 that engages the downstream shoulder 240 in the full gap position. Similar to the first embodiment, the outlet 214 is configured such that an outlet pressure acts on the annular ledge or rim 242 and such that a position of the plunger 216 is dependent on the outlet pressure. FIG. 13 shows the shuttle assembly 334 is the open position and the plunger 216 in a minimized gap position (thereby regulating flow pressure through the flow control device).

Figure 14:
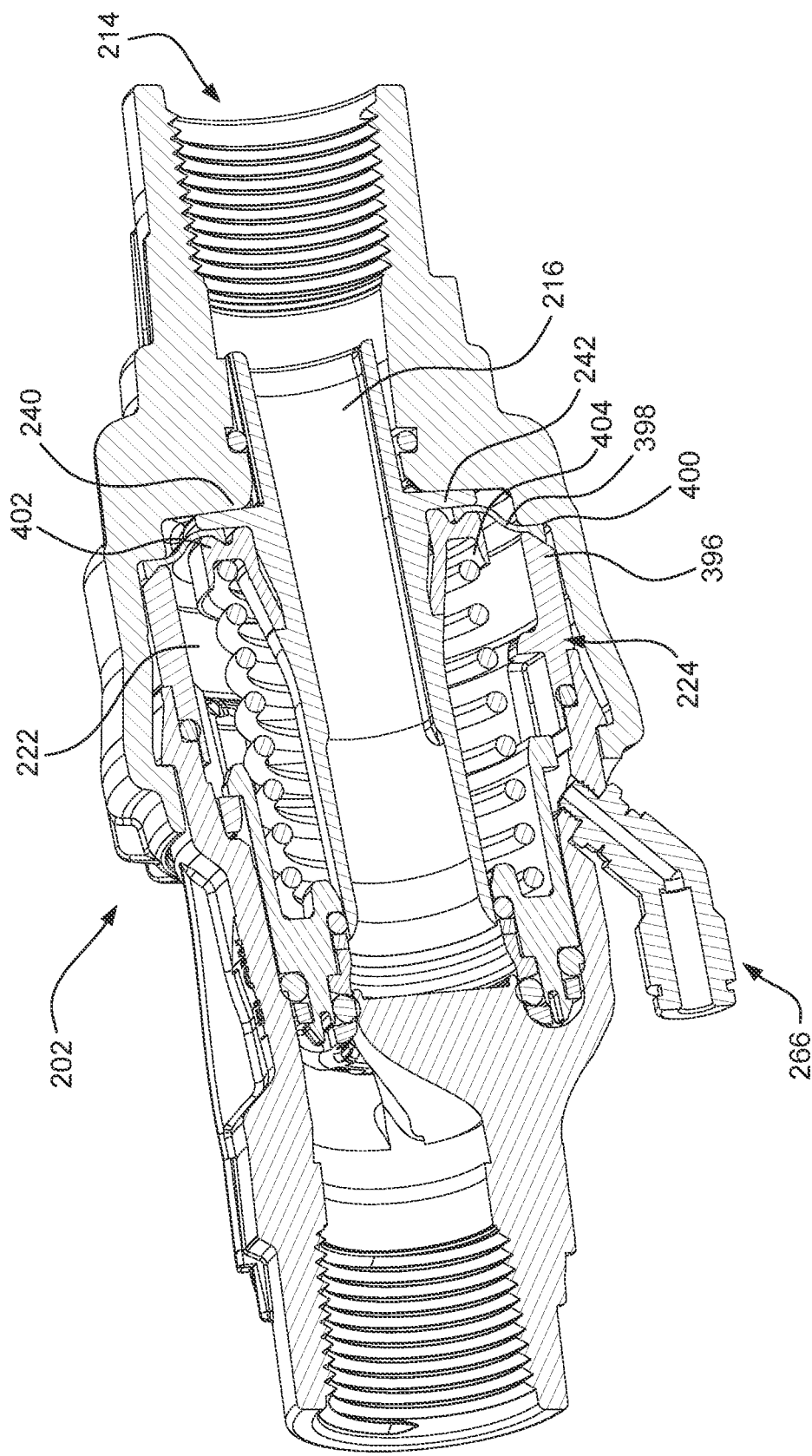
FIGS. 14-17 are cross-sectional views of a flow control device including the shuttle and liner of FIGS. 7 and 8 with pressure regulation using a diaphragm.

With reference to FIG. 14, a downstream annular edge 396 of the liner 224 may be seated in the housing 202 to secure an outer rim of an annular diaphragm 398 between the edge 396 and an annular ledge 400 of the housing 202. The edge 396 may be relatively thick in a radial direction and supported by ribs on the outer surface of the liner 224. The ribs may assist in centering the liner 224 within the housing 202 and thereby aligning the edge 396 with the outer rim of the diaphragm 398.

Figure 17:
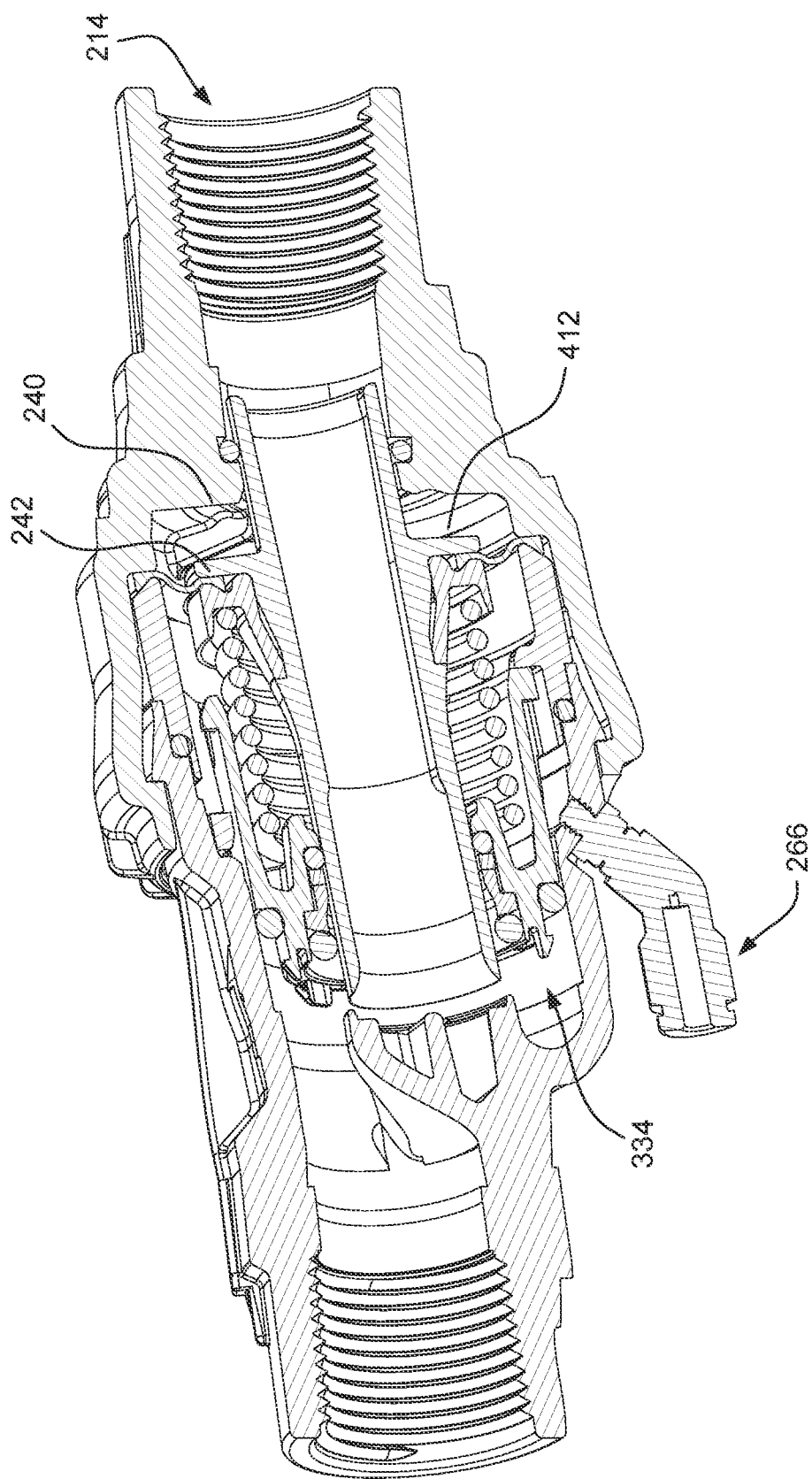

The diaphragm 398 may be an annular disc and has an inner ledge attached to an annular diaphragm support 402. The diaphragm support 402 moves with the flow conduit 216 and as the diaphragm 398 rolls due to water pressure changes in the outlet 214 and a pressure chamber 412 (FIG. 17) between the downstream shoulder 240 and the annular ledge 242. In some embodiments, the diaphragm 398 is a fabric reinforced member with rubber coating on both sides.

The diaphragm support 402 may be provided with a frustoconical support that engages the flow conduit 216. The frustoconical support includes fingers that grasp the outer surface of the flow conduit 216. The fingers engage a ridge or recess on the outer surface of the flow conduit 216 to lock the diaphragm support 402 to the flow conduit 216. The locking action also clamps the inner rim of the diaphragm 398 between the diaphragm support 402 and the annular rim 242 of the flow conduit 216.

The diaphragm support 402 has a forward-facing side with an annular channel 404 configured to receive an end of the helical spring 236. The rearward-facing end of the diaphragm support 402 includes an annular recess 408 (FIG. 15) to receive the inner rim of the diaphragm 398. The inner rim of the diaphragm 398 is clamped between the annular recess 408 of the diaphragm support 402 and the annular rim 242 of the flow conduit 216.

The shuttle assembly 334 is biased towards its forward position by the helical spring 236. A front end of the helical spring 236 is seated on an internal annular surface 416 (FIGS. 9 and 13) of the shuttle 220. In the forward position, the shuttle assembly 334 closes the gap and shuts off water flow through the flow control device. The spring force of the helical spring 236 and the area of the front surface 376 of the first annular seal support 344 (which forms the front surface of the shuttle assembly 334) are selected such that the force applied by water pressure against the front surface 376 overcomes the force of the helical spring 236 when the water pressure in the inlet 212 exceeds a threshold water pressure. When the water pressure in the inlet 212 exceeds the threshold water pressure, the pressure forces the shuttle assembly 334 to move rearward to open the gap. As the gap opens, water flows through the flow control device. The threshold water pressure may be increased by the application of a fluid pressure in the sealed chamber 222 (through port 266) in addition to the spring force, or may be reduced by the application of a vacuum in the sealed chamber 222 (F=chamber pressure×annular area between the OD of seal 338 and ID of seal 342). Manipulating the sealed chamber 222 pressure in such a manner also augments the regulated outlet pressure of the fluid flow by adding a force (F=chamber pressure×plunger area 242 or diaphragm area) to that of the spring force, thus requiring a higher outlet pressure to balance. In a similar manner, the outlet pressure may be reduced by the application of a vacuum in the sealed chamber 222.

Figure 15:
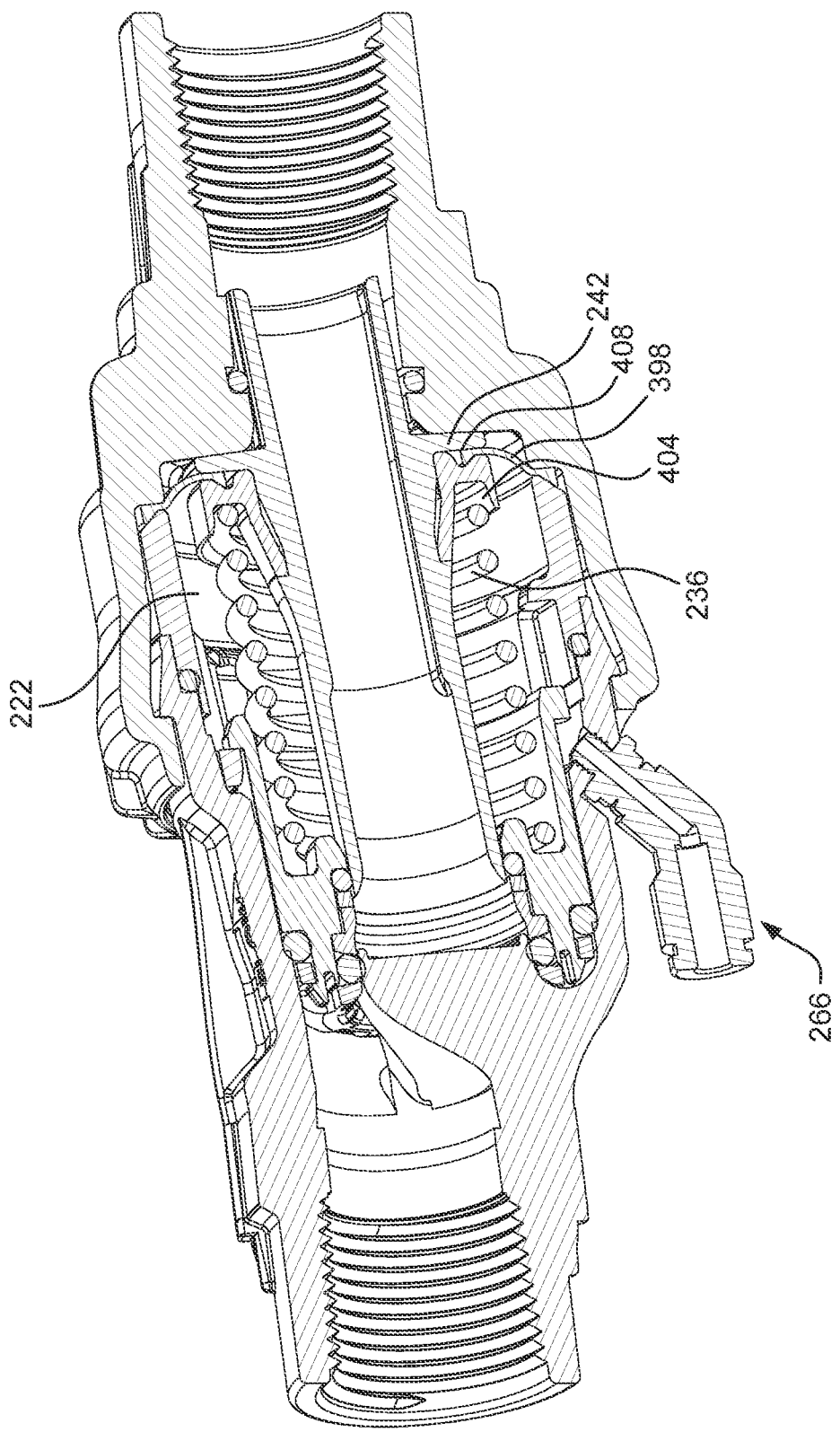
Figure 16:
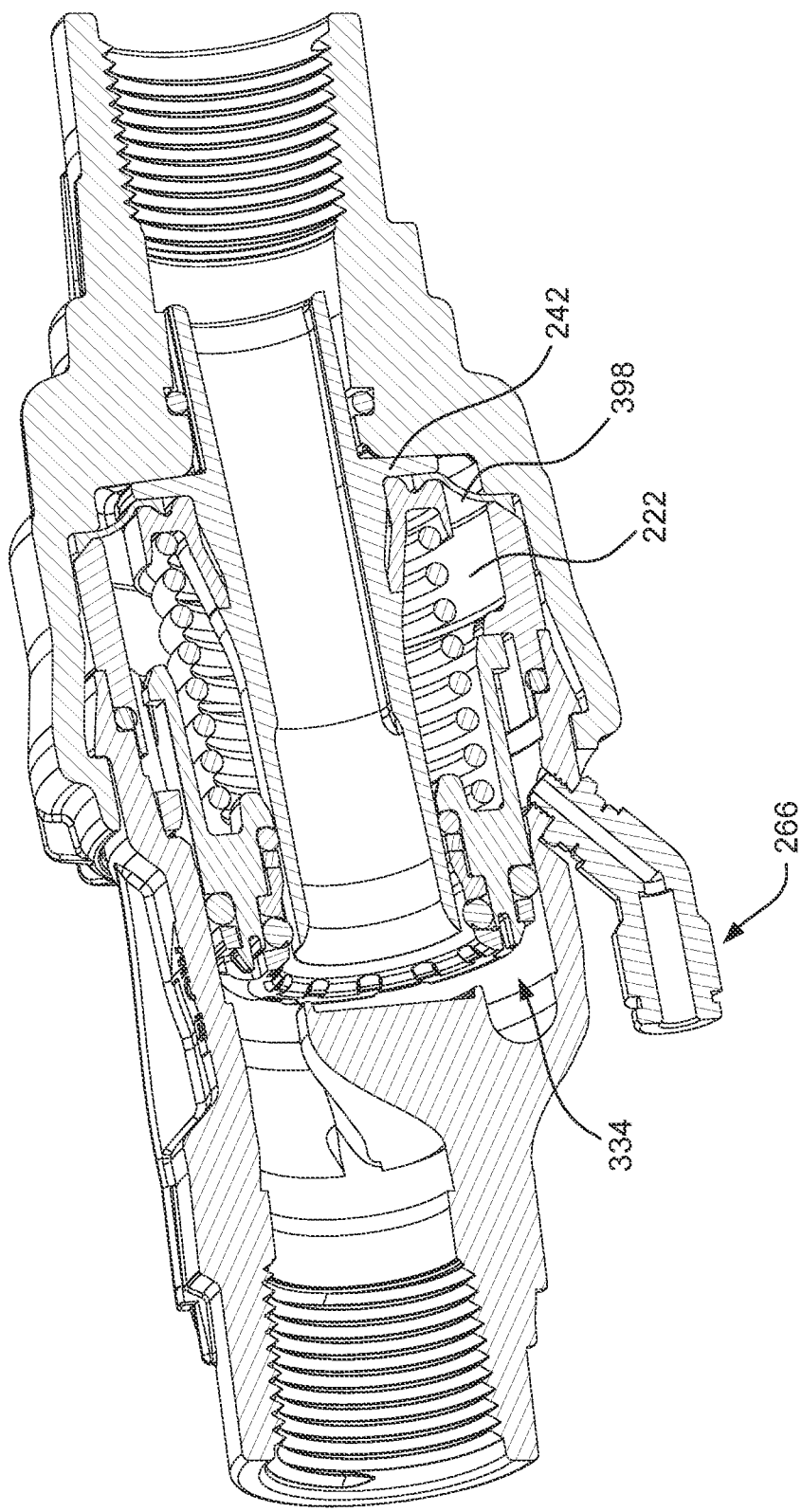

FIG. 14 shows the diaphragm 398 in a relaxed state with low pressure in the chamber 222 (e.g., via port 266) or the outlet 214. In FIG. 15, fluid pressure is increased in the chamber 222 via the port 266, and the diaphragm 398 bulges outward. In FIG. 16, the chamber 222 may be vented to atmosphere and/or the chamber pilot pressure plus the spring force is otherwise less than the inlet pressure, and the shuttle assembly 334 is displaced to the open position. As shown, the diaphragm 398 bulges in an upstream direction. From this state, with reference to FIG. 17, if the pressure at the outlet 214 increases, pressure in the chamber 412 similarly increases to displace the plunger 216 to a reduced gap position to regulate the outlet pressure.

The shuttle assembly 334 and helical spring 236 may be configured such that the shuttle assembly 334 moves quickly between the forward position and the rearward position. The shuttle assembly 334 may be configured to not dwell in an intermediate position between the most forward and most rearward positions. Moving the shuttle assembly 334 quickly from the forward position to the rearmost position when the threshold pressure is reached allows the shuttle assembly 334 to function as a simple on-off valve. Like the threshold pressure for the plunger, a threshold shuttle pressure for displacing the shuttle assembly 334 is similarly adjustable by modifying the pressure in the sealed chamber 222.

In light of the configuration of the housing and shuttle assembly, telescoping of the shuttle assembly in the liner is more stable. The shuttle assembly is also composed of readily manufacturable components that snap together. The lugs and stops on the shuttle and liner interact to keep the shuttle more square/normal to the plunger/seat axis at the open and closed positions of the shuttle. This helps with sealing integrity, particularly the seat/shuttle and the shuttle/plunger or shuttle/flow tube seals.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A flow control device comprising:
a housing including an inlet and an outlet;
a flow conduit disposed in the housing, wherein the inlet, the flow conduit, and the outlet define a flow passage;
a valve seat disposed in the housing downstream of the inlet;
a shuttle movably disposed in the housing and displaceable between a closed position engaging the valve seat to close the flow passage and an open position spaced from the valve seat to open the flow passage;
a sealed chamber defined between the housing and the flow conduit;
a port coupled with a source of pressurized fluid, the port communicating with the sealed chamber, wherein the shuttle is displaceable between the closed position and the open position in a manner that is influenced by a pressure in the sealed chamber; and a spring acting between the flow conduit and the shuttle, the spring biasing the shuttle toward the closed position.

2. A flow control device according to claim 1, wherein the flow conduit is fixed in the housing.

3. A flow control device according to claim 2, wherein the port comprises a valve, and wherein the flow control device further comprises a controller communicating with the valve that is configured to displace the shuttle between the closed position and the open position.

4. A flow control device according to claim 1, further comprising a liner fixed in the housing and positioned between the housing and the sealed chamber.

5. A flow control device according to claim 4, wherein the shuttle comprises a downstream annular rim including a circumferential lug, and wherein the liner includes an upstream stop with which the circumferential lug engages when the shuttle is displaced to the closed position and a downstream stop with which the circumferential lug engages when the shuttle is displaced to the open position.

6. A flow control device according to claim 4, wherein the shuttle comprises a downstream annular rim, and wherein the housing includes a cylindrical guide surface, the downstream annular rim of the shuttle bearing against the cylindrical guide surface.

7. A flow control device according to claim 6, wherein the shuttle comprises an upstream annular rim positioned radially inward of the downstream annular rim, the upstream annular rim engaging the valve seat when the shuttle is displaced into the closed position.

8. A flow control device according to claim 4, further comprising an annular diaphragm support coupled with the flow conduit and a diaphragm, wherein the diaphragm is secured between the annular diaphragm support and the flow conduit and between the liner and the housing.

9. A flow control device according to claim 1, wherein the flow conduit comprises a plunger that is displaceable in the housing between a full gap position and a reduced gap position.

10. A flow control device according to claim 9, wherein the housing comprises a downstream shoulder upstream of the outlet, and wherein the plunger comprises an annular ledge that engages the downstream shoulder in the full gap position.

11. A flow control device according to claim 10, wherein the outlet is configured such that an outlet pressure acts on the annular ledge and such that a position of the plunger is dependent on the outlet pressure.

12. A flow control device according to claim 10, further comprising:
a liner fixed in the housing and positioned between the housing and the sealed chamber;
an annular diaphragm support coupled with the plunger; and
a diaphragm secured between the annular diaphragm support and the annular ledge of the plunger and between the liner and the housing.

13. A flow control device according to claim 12, wherein the diaphragm comprises a fabric reinforced member with rubber coating on both sides.

14. A flow control device according to claim 9, wherein the sealed chamber is configured such that a threshold water pressure for displacing the plunger is adjustable by modifying the pressure in the sealed chamber.

15. A flow control device according to claim 1, wherein the sealed chamber is configured such that a threshold shuttle pressure for displacing the shuttle is adjustable by modifying the pressure in the sealed chamber.

16. A flow control device comprising:
a housing including an inlet and an outlet;
a flow conduit disposed in the housing, wherein the inlet, the flow conduit, and the outlet define a flow passage;
a valve seat disposed in the housing downstream of the inlet;
a shuttle movably disposed in the housing and displaceable between a closed position engaging the valve seat to close the flow passage and an open position spaced from the valve seat to open the flow passage;
a sealed chamber defined between the housing and the flow conduit;
a liner fixed in the housing and positioned between the housing and the shuttle, wherein the shuttle is displaceable in the liner, wherein the shuttle comprises a first lug and a second lug, and wherein the liner comprises a downstream stop and an upstream stop, the first lug engaging the downstream stop when the shuttle is in the open position, and the second lug engaging the upstream stop when the shuttle is in the closed position; and
a port coupled with a source of pressurized fluid, the port communicating with the sealed chamber, wherein the shuttle is displaceable between the closed position and the open position in a manner that is influenced by a pressure in the sealed chamber,
wherein the port comprises a valve, and wherein the flow control device further comprises a controller communicating with the valve that is configured to displace the shuttle between the closed position and the open position.

17. A flow control device according to claim 16, further comprising a plurality of seal supports coupled with the shuttle and a corresponding plurality of seals secured to the seal supports, wherein the seal supports are secured to the shuttle in a snap fit.

18. A flow control device according to claim 16, wherein the flow conduit is fixed in the housing.

19. A flow control device according to claim 16, wherein the flow conduit comprises a plunger that is displaceable in the housing between a full gap position and a reduced gap position.

20. A flow control device according to claim 19, wherein the sealed chamber is configured such that a threshold water pressure for displacing the plunger is adjustable by modifying the pressure in the sealed chamber.

* * * * *